United States Patent
Wichner

(10) Patent No.: US 11,680,774 B2
(45) Date of Patent: Jun. 20, 2023

(54) METHODS AND SYSTEMS FOR TRAINING AND SAFETY FOR FIREARM USE

(71) Applicant: Brian Donald Wichner, Otter Rock, OR (US)

(72) Inventor: Brian Donald Wichner, Otter Rock, OR (US)

(*) Notice: Subject to any disclaimer, the term of this patent is extended or adjusted under 35 U.S.C. 154(b) by 891 days.

(21) Appl. No.: 16/580,392

(22) Filed: Sep. 24, 2019

(65) Prior Publication Data

US 2020/0018570 A1     Jan. 16, 2020

Related U.S. Application Data

(63) Continuation of application No. 15/338,459, filed on Oct. 31, 2016, now Pat. No. 10,495,416, which is a continuation of application No. 14/554,004, filed on Nov. 25, 2014, now abandoned, which is a continuation-in-part of application No. 14/522,913, filed on Oct. 24, 2014, now abandoned, which is a continuation of application No. 13/831,926, filed on Mar. 15, 2013, now Pat. No. 8,887,430.

(60) Provisional application No. 61/751,242, filed on Jan. 10, 2013.

(51) Int. Cl.
| | |
|---|---|
| F41G 3/26 | (2006.01) |
| G01H 17/00 | (2006.01) |
| G01B 17/00 | (2006.01) |
| F41A 17/12 | (2006.01) |
| F41A 17/08 | (2006.01) |
| G08B 21/18 | (2006.01) |

(52) U.S. Cl.
CPC ............... *F41G 3/26* (2013.01); *F41A 17/08* (2013.01); *F41A 17/12* (2013.01); *G01B 17/00* (2013.01); *G01H 17/00* (2013.01); *G08B 21/182* (2013.01)

(58) Field of Classification Search
CPC .......... F41A 33/00; F41A 33/02; F41A 33/04; F41A 33/06; F41A 17/08; F41A 17/12; G08B 21/182; F41G 3/26; G01B 17/00; G01H 17/00
See application file for complete search history.

(56) References Cited

U.S. PATENT DOCUMENTS

| | | | |
|---|---|---|---|
| 5,924,232 A | 7/1999 | Rhoden et al. | |
| 9,378,515 B1 * | 6/2016 | Hassett | H04W 4/023 |
| 2011/0047847 A1 * | 3/2011 | Hughes | F41A 19/16 |
| | | | 42/84 |
| 2013/0071815 A1 | 3/2013 | Hudson et al. | |

(Continued)

OTHER PUBLICATIONS

First non-final Office Action for U.S. Appl. No. 14/522,913, dated Jan. 13, 2015.

(Continued)

*Primary Examiner* — Timothy A Musselman

(57) ABSTRACT

An apparatus, device, or method may detect or track aim direction or motion of a firearm and display information indicative of such aim direction or motion. Sequence of bullet strikes on a real or virtual target by multiple gunshots may be determined. A method may comprise detecting one or more gunshots of the firearm discharging live ammunition, measuring or determining aim directions or motions of the firearm before, during, and/or after the one or more gunshots, recording these measurements or determinations, and generating output for displaying images on a display.

20 Claims, 25 Drawing Sheets

(56) References Cited

U.S. PATENT DOCUMENTS

| | | |
|---|---|---|
| 2013/0203019 A1 | 8/2013 | Nolen |
| 2014/0038136 A1* | 2/2014 | Hamilton ................. F41G 3/26 434/19 |
| 2014/0272807 A1 | 9/2014 | Guenther et al. |
| 2018/0260979 A1 | 9/2018 | Lyren |

OTHER PUBLICATIONS

Applicant's response to the first Office Action for U.S. Appl. No. 14/522,913, filed Apr. 13, 2015.
Restriction Requirement for U.S. Appl. No. 14/554,004, dated Jan. 5, 2016.
Applicant's response to Restriction Requirement for U.S. Appl. No. 14/554,004, filed Mar. 3, 2016.
Restriction Requirement for U.S. Appl. No. 14/554,004, dated Mar. 23, 2016.
Applicant's response to Restriction Requirement for U.S. Appl. No. 14/554,004, filed May 23, 2016.
Notice of Allowance for U.S. Appl. No. 14/554,004, dated Aug. 12, 2016.
Notice of Abandonment for U.S. Appl. No. 14/554,004, dated Dec. 1, 2016.
First Notice of Allowance for U.S. Appl. No. 15/345,512, dated Dec. 19, 2016.
Second Notice of Allowance for U.S. Appl. No. 15/345,512, dated Jan. 23, 2017.
Issue Notification for U.S. Appl. No. 15/345,512, dated Mar. 22, 2017.
Restriction Requirement for U.S. Appl. No. 15/338,459, dated Feb. 5, 2018.
Response to Restriction Requirement for U.S. Appl. No. 15/338,459, filed Mar. 16, 2018.
Non-final Office Action for U.S. Appl. No. 15/338,459, dated Jul. 5, 2018.
Response to non-final Office Action for U.S. Appl. No. 15/338,459, filed Oct. 4, 2018.
Restriction Requirement for U.S. Appl. No. 15/338,459, dated Jan. 29, 2019.
Response to Restriction Requirement for U.S. Appl. No. 15/338,459, filed Mar. 28, 2019.
Notice of Allowance for U.S. Appl. No. 15/338,459, dated Aug. 6, 2019.
Issue Notification for U.S. Appl. No. 15/338,459, dated Nov. 13, 2019.

* cited by examiner

METHODS AND SYSTEMS FOR TRAINING AND SAFETY FOR FIREARM USE

This patent application is a Continuation of pending U.S. patent application Ser. No. 15/338,459, filed on Oct. 31, 2016, which is a Continuation of U.S. patent application Ser. No. 14/554,004, filed on Nov. 25, 2014, which application has been abandoned, which is a Continuation-in-Part of U.S. patent application Ser. No. 14/522,913, filed on Oct. 24, 2014, which application has been abandoned, which is a Continuation of, and claims benefit of and priority to U.S. patent application Ser. No. 13/831,926, filed on Mar. 15, 2013, now U.S. Pat. No. 8,887,430, issued Nov. 18, 2014, which claims benefit of and priority to U.S. Provisional Patent Application Ser. No. 61/751,242, filed on Jan. 10, 2013, entitled "Firearm Aim Detection and Warning System", the contents of which are incorporated herein by reference in their entirety.

BACKGROUND

Field

Subject matter disclosed herein relates to systems and methods for providing aim detection and motion detection of a firearm, and more particularly, systems and methods for aim detection and motion detection that allows for firearm training and safety.

Information

Firearms, such as handguns or rifles, are used by millions of people for any of a number of reasons, such as for law enforcement, military use, defense, hunting, competition, or recreational use. Firearm users, from beginners to experts, often spend effort and time to improve their shooting skills and firearm-handling skills. For example, firearm users may shoot at a target (target practice) to practice their aim. Firearm users may also practice handling and operating their firearm so as to improve their familiarity with the firearm and to improve their efficiency at handling the firearm.

Among other things, practicing or improving shooting skills and firearm-handling skills may help reduce firearm accidents. For example, firearms are involved in a number of accidental deaths or injuries per year in the United States. One feature of firearms that may lead to a number of accidents is that aiming or pointing a firearm in any direction may be effortless: A user holding a firearm may easily, inadvertently point the firearm toward an adjacent shooter at a firing range just as easily as the user may aim at an intended target in the firing range, for example. Accordingly, many firing ranges, where shooters practice their skills at using a firearm, have strict rules regarding how to orient a firearm at all times. For example, a user inadvertently, even for a moment, pointing a firearm in a direction other than downward or at a target of a firing range may result in the user being dismissed from the firing range.

Handguns may be particularly problematic compared to rifles: It may be extremely easy to wave a handgun in any direction. Unless a user has, over years perhaps, developed careful habits for handling a firearm, a user may often need to apply extra effort while handling a firearm to ensure that the firearm is never pointing in an unintentional direction. This may hold truer for younger shooters or beginners first handling a firearm. However, more experienced shooters may become lackadaisical, careless, or even just tired.

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

Figure 1:
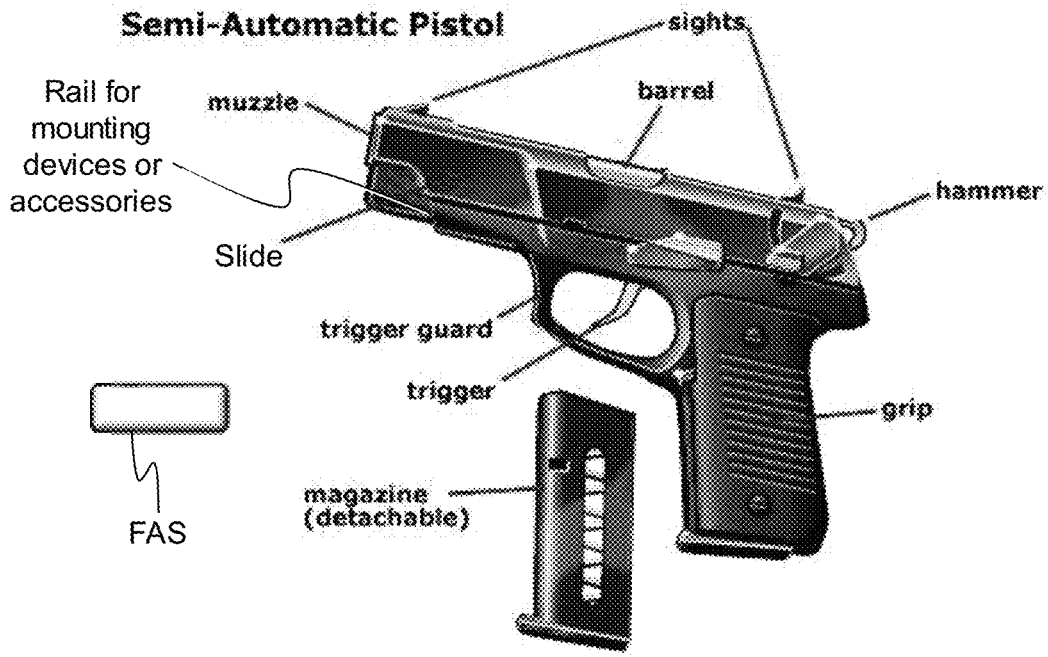
FIG. 1 is a perspective view of a semi-automatic pistol, according to an embodiment.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

In an embodiment, a method may be used to detect aim or pointing direction of a firearm while the firearm is held and operated by a user (e.g., shooter). Aim direction of a firearm may mean a direction that a round (e.g., a bullet or shot, etc.) would travel from the firearm upon or after being discharged. The method, which may be performed by an aim-detector-safety-device (ADSD), a recoil measuring system (RMS), or a shot sequencing system (SSS) attached to a firearm, may comprise detecting a gunshot made by the firearm. In another implementation, an ADSD, RMS, or SSS may comprise an aim-detector-device, wherein aim may be a primary concern over safety (though, practically speaking, safety of firearms is desirably of utmost importance). Though a shooter may be in control of an aim direction of a firearm, the shooter may inadvertently, from time to time, point the firearm in a dangerous direction. An ADSD may detect such a direction and warm the shooter or people near the shooter of such a dangerous direction.

In some embodiments, an RMS may perform a number of operations to measure various parameters associated with recoil or kickback of a firearm, such as when the firearm discharges live ammunition. Live ammunition includes a bullet or projectile projected into motion by gun powder or other substance in an explosive reaction. Embodiments may also include bullet or projectiles projected into motion by mechanical techniques, such as compressed springs, for example. Operations for measuring various parameters associated with recoil or kickback of a firearm may include detecting a gunshot of a firearm; sensing an aim direction of the firearm substantially at the time of detecting the gunshot; setting a reference direction based, at least in part, on the aim direction; sensing subsequent aim directions of the firearm after the time of detecting the gunshot; comparing any of the subsequent aim directions to the reference direction; and generating one or more recoil measurements based, at least in part, on the comparing. In some implementations, a microphone may be used to sense a gunshot by detecting the sound or sound signature of the gunshot. In some implementations, a 3D sensor (or more than one 3D sensor) may be used to sense a gunshot by detecting recoil or kickback of the gunshot. In some implementations, a combination of a microphone and 3D sensor may be used to detect a gunshot.

In some embodiments, shooting at a target may involve firing multiple gunshots from a firearm at the target, which may be some distance away from the shooter. Often, the target may be far enough away that personnel, such as the shooter and any bystanders, may not be able to see bullet strike marks on the target. Accordingly, in some cases, results of target practice may be determined only after personnel walk up to the target to closely inspect bullet strike marks on the target. Bullet strike marks on a target may comprise holes, colored spots or rings (e.g., in color-reactive targets), a distorted spot, or a visible mark, just to list a few examples.

Another challenge facing determination of results of target practice may be that for a sequence of gunshots, it may be difficult or impossible to determine which bullet strike marks on a target correspond to which of the gunshots in the sequence. Moreover, a shooter may fire a dozen or so rounds (gunshots) in a span of a few seconds. Such a grouping of gunshots may make it difficult or impossible to determine the sequence of bullet strikes. Questions may be, for example, which bullet strike mark corresponds to the first gunshot? What part of the target did the fourth gunshot strike? And so on.

A knowledge of sequence of shots may be useful for determining if a gun sight (e.g., scope 510) is positioned inaccurately on the firearm, or if a shooter tends to visualize the target with a bias that leads to inaccurate shots at the target. For example, if the first gunshot of a group is further from a bull's eye than subsequent gunshots, and such first shots are consistently to the left (for example) for a number of gunshot groups, then a correction to the firearm and/or the shooter may be needed to remove a bias (due to the firearm, the shooter, or both) so that shooting accuracy may be improved.

In such an example, a useful ability is to be able to determine which of a number of gunshots is the first gunshot. In some embodiments, an SSS may perform a process that indicates which bullet strike marks on a target correspond to which gunshots in a sequence of gunshots. Such a process may include generating a display to be displayed on a display device, where the display includes bullet strike location information and corresponding shot sequence order for each of the bullet strikes. The process may include detecting gunshots of the firearm discharging live ammunition; measuring aim directions of the firearm substantially at times of detecting each of the gunshots (e.g., the time of detecting a gunshot is substantially the same as the time that the gunshot occurs); recording the times of each of the gunshots and/or recording the sequence of the gunshots and associating the times and/or the sequence with the measured aim directions; and generating output for rendering a display image that includes bullet strike icons that represent bullet strikes on a target. Locations of the bullet strike icons in the display image may be based, at least in part, on the measured aim directions of each of the gunshots.

In various embodiments, functionality of an ADSD, an RMS, and an SSS may overlap, and need not be exclusive. In other words, for example, an ADSD may perform some functions of an RMS or an SSS, and vice versa. Even though some embodiments are described below for a particular one of an ADSD, an RMS, or an SSS, at least some of the descriptions of the embodiments may also apply to any of the other two of the ADSD, RMS, or SSS. For sake of convenience, the term "firearm accessory system" (FAS) will be used in the descriptions below for embodiments regarding an ADSD, an RMS, and/or an SSS.

An FAS may comprise a number of components, which may be integrated together, or may be separated and located at different places. For example, in one implementation, an FAS may comprise a processor and/or other electronics, a 3D sensor, and/or a touch sensor, which may all be integrated together and located on a firearm. In another implementation, an FAS may comprise a processor and/or other electronics, a 3D sensor, and/or a touch sensor, wherein the 3D sensor and touch sensor may be located on a firearm while the processor and/or other electronics is located remotely from the firearm. Such components may communicate among one another via wireless signals (e.g., Bluetooth), for example. In yet another implementation, an FAS may comprise a processor and/or other electronics, a 3D sensor, and/or a touch sensor, wherein the 3D sensor and touch sensor may be located on a firearm remotely from the processor and/or other electronics, which is also located on the firearm. Such components may communicate among one another via wireless signals (e.g., Bluetooth), or wired signals, for example.

Detecting a gunshot may comprise receiving sound waves or shock waves at a sensor (e.g., microphone, piezoelectric (PZT) device, or accelerometer, just to name a few examples), and determining whether the sound or shock waves were produced by a gunshot of the firearm. For example, the sound or shock waves may be converted (e.g., by a microphone, PZT device, accelerometer, or other transducer device) to an electronic signal comprising a sound signature. An accelerometer attached to a portion of a firearm, for example, may detect recoil of the shooting firearm. Such recoil may comprise an identifiable motion signature (e.g., firearm suddenly accelerated backward). A processor, or other electronics, of the FAS, for example, may compare a sound signature with a number of sound signatures stored in a memory of an FAS. Amplitude and/or frequency distribution in time or frequency space may be analyzed using code executable by a processor, for example. The particular firearm to which the FAS (or a portion thereof) is attached may produce a particular sound signature that is different from a sound signature produced by discharge of another firearm, even if the firearms are firing the same types of rounds, for example. In one implementation, a sound signature of a gunshot of the firearm to which the FAS is attached may be different from a gunshot of another firearm because the intensity of a shock or sound wave may be greater from the gunshot produced by the firearm to which the FAS is attached compared to other firearms in the vicinity, for example. Further, a gunshot of one firearm will not produce recoil of another firearm.

The method may further comprise sensing the aim direction of the firearm substantially at the time of detecting a gunshot (e.g., when a shooter fires the firearm). A gunshot means discharge of a firearm, so that a round (e.g., bullet or shot) is activated or discharged and the firearm fires the bullet or shot out of the firearm in the aim direction set forth by the shooter. Aim direction may be sensed by a position sensor using 3D sensing technology, such as that used in Wii gaming, by Nintendo Corporation of Japan, for example. 3D sensing technology may use gyroscopic or accelerometer techniques in some examples. Single- and multi-axis models of accelerometers may detect magnitude and/or direction of acceleration (e.g., g-force), as a vector quantity, and may be used to sense orientation (e.g., because direction of weight changes), coordinate acceleration (e.g., if it produces g-force or a change in g-force), vibration, shock, and falling in a resistive medium (a case where the proper acceleration changes, since it starts at zero, then increases). In an implementation, an accelerometer, such as a micro-machined accelerometer, may be used in or by an FAS to detect the position and/or orientation of the device.

The method may further include setting a reference aim direction based, at least in part, on the aim direction sensed when the gunshot was detected, for example. In other implementations, a reference aim direction may be manually selected by a user, or a reference aim direction may be reset upon or after a subsequent gunshot is detected. Such resetting based, at least in part, on subsequent gunshots may help to avoid undesirable accumulation errors that 3D sensors may experience over time. Accumulation errors may involve loss of accuracy of orientation with respect to a reference direction, for example.

In the method, a shooter's current aim direction of the firearm may be sensed continuously or from time to time. For example, aim direction may be sensed about a few times per second. A processor or other types of electronics in the FAS may compare current aim direction to the reference aim direction (e.g., the aim direction of the firearm when a gunshot was fired). An alarm, which may be audible or visible to a user or other people in the vicinity, may be initiated if a current aim direction is beyond a threshold angle of displacement from the reference aim direction. Threshold angles of displacement may be defined by criteria a priori established and stored in a memory of the FAS. Threshold angles may define aim violation directions. Threshold angles may comprise horizontal angles of displacement from a reference aim direction and may comprise angles of displacement from horizontal, as defined by gravity, for example. Herein, angles of displacement from horizontal are called azimuthal angles. For a numeric example, if a reference aim direction is defined to be at zero degrees, an aim violation may be considered to occur if the aim direction of the firearm is greater than 60 degrees horizontally to the right or to the left of the axis of the firearm. It may be clear that a gun pointing greater than 60 degrees toward the right or left of a shooter may be dangerous for persons standing to the sides of a shooter. Thus, in this case, a horizontal threshold angle may be 60 degrees. A horizontal threshold angle may depend, at least in part, on azimuthal angle. For example, if a firearm is pointing downward, than a horizontal threshold angle may increase from 60 degrees to 80 degrees, just to give some numeric examples. Different venues (e.g., shooting clubs, shooting ranges, parent teaching children to shoot, instructors teaching adults to shoot, and so on) may develop different criteria and different horizontal and azimuthal threshold angles. In such cases, dangers of a shooter aiming a firearm in a direction that violates a particular shooting club's rules, for example, may be questionable or debatable. However, an FAS may nevertheless be useful for enforcing such rules regarding how a shooter operates or controls his firearm.

In one embodiment, an intensity of an alarm may be based, at least in part, on horizontal and/or azimuthal angles of displacement from a reference aim direction. For example, an alarm may sound at a first intensity if a current aim direction just exceeds threshold angles (e.g., if the firearm is determined to be violating aim criteria). The intensity of the alarm may increase as a horizontal and/or azimuthal angle of displacement from the reference aim direction increases. In other words, the more a firearm is violating aim criteria, the louder an alarm may be.

In one embodiment, an FAS may be capable of, and a method may include, detecting a sound signature of a round being loaded into a chamber of a firearm. Detecting a round being loaded into a chamber may comprise receiving sound waves or shock waves at a sensor (e.g., microphone or piezoelectric (PZT) device, just to name a few examples), and determining whether the sound or shock waves were produced by a round being loaded into a chamber of the firearm. For example, the sound or shock waves may be converted (e.g., by a microphone, PZT device, or other transducer device) to an electronic signal comprising a sound signature. A processor, or other electronics, of the FAS, for example, may compare a sound signature with a number of sound signatures stored in a memory of an FAS. Amplitude and/or frequency distribution in time or frequency space may be analyzed using code executable by a processor, for example. The particular firearm to which the FAS is attached may produce a particular sound signature that is different from a sound signature produced by a round being loaded into a chamber of another firearm, even if the firearms are being loaded with the same types of rounds, for example. In one implementation, a sound signature of a round being loaded into a chamber of the firearm to which the FAS is attached may be different from a round being loaded into a chamber of another firearm because the intensity of a shock or sound wave may be greater from the round being loaded into a chamber of the firearm to which the FAS is attached compared to that of other firearms in the vicinity, for example.

In one implementation, the intensity of an alarm may be based, at least in part, on detecting that a round is in a chamber of the firearm (e.g., detecting a sound signature of a round being loaded into a chamber of a firearm). For example, an alarm may be louder if a round is determined by the FAS to be in the chamber of the firearm compared to the case of an empty chamber.

In one embodiment, an FAS may be capable of, and a method may include, detecting if a finger of a user is on or near a trigger of the firearm to which the FAS is attached. For example, as explained below, an FAS may include a trigger finger rest pad comprising a touch sensor that a user touches while the user is not intending to touch a trigger of the firearm. In one implementation, the intensity of an alarm may be based, at least in part, on detecting if a finger is on or near a trigger of the firearm. For example, an alarm may be louder if a finger is on the trigger compared to the case where the finger is not on or near the trigger.

In some embodiments, a reference aim direction may be set by a user, and an FAS need not have a capability to detect sounds or shocks. For example, an FAS may initiate an alarm if a shooter's aim direction of a firearm is in an unsafe angular range, relative to a reference aim direction a priori set manually by a user.

In an embodiment, a sensor, herein called a 3D sensor, may comprise one or more accelerometers, one or more inertial sensors, and/or one or more gyroscopes (e.g., MEMS gyroscopes). Such a sensor, which may comprise a solid state chip and/or integrated circuit package may sense the following of an object that it is attached to, such as a firearm: tilt and rotation up and down; tilt and rotation left and right; rotation along a main axis (e.g., as with a screwdriver twist); acceleration up and down; acceleration left and right; acceleration toward a point and away from the point; and so on. A sensor may comprise, for example, three accelerometers to measure acceleration or displacement in each of the three orthogonal axes. Accordingly, a sensor affixed to a firearm may sense such motions or orientations relative to a reference direction, such as a particular target at a firing range, for example.

In an embodiment, MEMS inertial accelerometers may comprise a mass-spring system, which may reside in a vacuum. Exerting acceleration on the accelerometer may result in a displacement of the mass in the spring system. The displacement of the mass may depend, at least in part, on the mass-spring system, so a calibration may be needed. Read-out may be via a capacitive system. MEMS accelerometers may be available in 1D, 2D and 3D versions.

In an embodiment, inertial gyroscopes may be found in various classes, such as Ring Laser Gyroscopes (RLG), Fiber Optic Gyros (FOG), and MEMS Gyroscopes. MEMS gyroscopes may comprise a small vibrating mass that oscillates at e.g. 10's of kHz. The mass may be suspended in a spring system, and readout may be via a capacitive system as it is in accelerometers. If the gyroscope is rotated, the rotation may exert a perpendicular Coriolis-force on the mass that may be larger if the mass is further away from the center of rotation. The oscillating mass thus may lead to a different read-out on either side of the oscillation, which may be a measure for rate of turn.

In an embodiment, some commercial devices, such as piezoelectric, piezoresistive, and/or capacitive components may be used to convert mechanical motion into an electrical signal. Piezoelectric accelerometers may use piezoceramics (e.g. lead zirconate titanate) or single crystals (e.g. quartz, tourmaline). Piezoceramics may be desirable in terms of their upper frequency range, low packaged weight and high temperature range. Piezoresistive accelerometers may be desirable for high shock applications. Capacitive accelerometers may use a silicon micro-machined sensing element. Their performance may be desirable in a low frequency range and they may be operated in servo mode to achieve high stability and linearity, for example.

In an embodiment, accelerometers may comprise relatively small micro electro-mechanical systems (MEMS), and may include a cantilever beam with a proof mass (also known as seismic mass). Damping may result from residual gas sealed in the device. As long as the Q-factor is not too low, damping need not result in a lower sensitivity. Under the influence of external accelerations the proof mass may deflect from its neutral position. This deflection may be measured in an analog or digital manner. For example, the capacitance between a set of fixed beams and a set of beams attached to the proof mass may be measured. Integrating piezoresistors in the springs to detect spring deformation, and thus deflection, may be a good alternative, although a few more process steps may be involved during a fabrication sequence.

In an embodiment, micromechanical accelerometers may operate in-plane, that is, they may be designed to be sensitive only to a direction in a plane of the die. By integrating two devices perpendicularly on a single die, a two-axis accelerometer may be made. By adding an additional out-of-plane device three axes may be measured. Such a combination may have lower misalignment error than three discrete models combined after packaging. Micromechanical accelerometers may be commercially available in a wide variety of measuring ranges, reaching up to thousands of g's. A designer may face a compromise between sensitivity and maximum acceleration that may be measured.

A 3D sensor may be relatively small, and mountable on a firearm. The 3D sensor may include a transmitter to transmit wireless electronic signals to an FAS. For example, a 3D sensor may be about the size of a thick coin (e.g., about 2 centimeters diameter and about 0.5 or 1.0 centimeters thick), or about the size of a small cube (e.g., about 2.0 cubic centimeters), just to give a few examples. Of course, a sensor may have any dimensions, and claimed subject matter is not so limited to any particular sizes or shapes. A 3D sensor may include a self-adhesive portion so that the 3D sensor may be affixed to a portion of a firearm using an adhesive, such as illustrated in FIG. 6C.

An FAS may provide a number of benefits. For example, beginning shooters at firing ranges may have a dangerous habit or lack of discipline of pointing a gun in directions other than a general direction of a target. An FAS may reinforce good habits of shooters by sounding an alarm if the shooter aims the firearm in a dangerous direction. Moreover, an FAS may help to reinforce good habits of a shooter by silencing an alarm in response to the shooter correcting his/her aim to a safe direction (e.g., toward a target of a shooting range). Accordingly, interaction of the behavior of an FAS with the behavior of a shooter may teach the shooter safe firearm practices.

An FAS may be considered as a teaching tool for teachers or a self-teaching tool for students or beginning shooters. An FAS may provide a benefit to shooting instructors in teaching safe shooting skills to students. For example, an instructor's attention need not be mostly limited to observing a single student's aim of a firearm. An FAS may assist an instructor by sounding an alarm if one of one or more students aims a gun in a dangerous direction: The instructor may hear the alarm of a dangerous aim of a gun even if the instructor did not see such an aim occur. Also, in another example, an FAS may record aim violations (e.g., number of occurrences) so that an instructor may evaluate a student at the "end of a day". Of course, such benefits are merely examples, and claimed subject matter is not so limited.

FIG. 1 is a perspective view of a firearm comprising a semi-automatic pistol, according to an embodiment. A schematic representation of an FAS, at least a portion of which may be located on or in the firearm, is illustrated. Various parts and portions are named in the figure. Well-known in the art, various brackets may be attached to the pistol to mount a device above the slide, for example.

Figure 2:
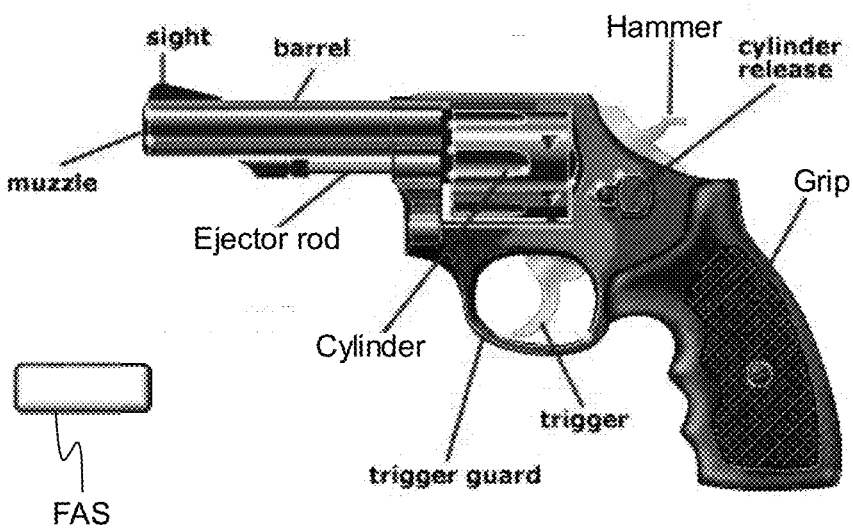
FIG. 2 is a perspective view of a revolver, according to an embodiment.

FIG. 2 is a perspective view of a firearm comprising a revolver, according to an embodiment. Various parts and portions are named in the figure. A schematic representation of an FAS, at least a portion of which may be located on or in the firearm, is illustrated.

Figure 3:
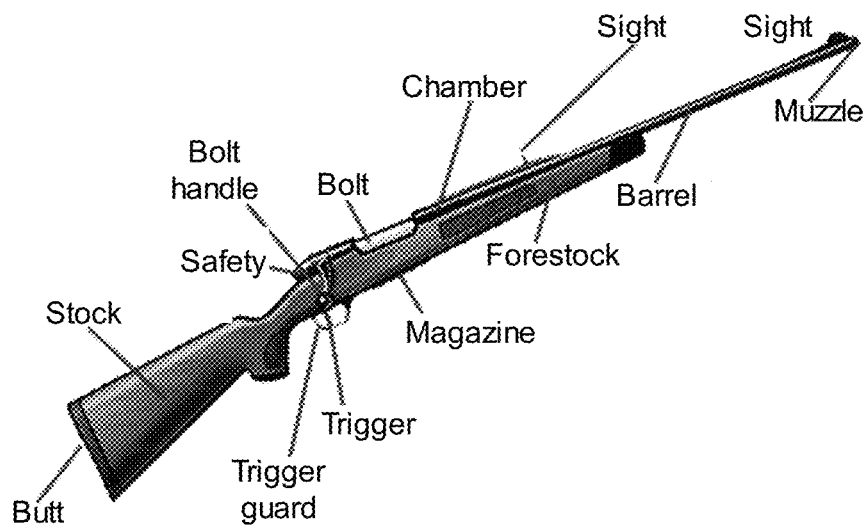
FIG. 3 is a side view of a bolt-action rifle, according to an embodiment.
Figure 3:
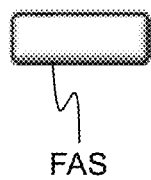

FIG. 3 is a side view of a firearm comprising a bolt-action rifle, according to an embodiment. Various parts and portions are named in the figure. A schematic representation of an FAS, at least a portion of which may be located on or in the firearm, is illustrated.

Figure 4:
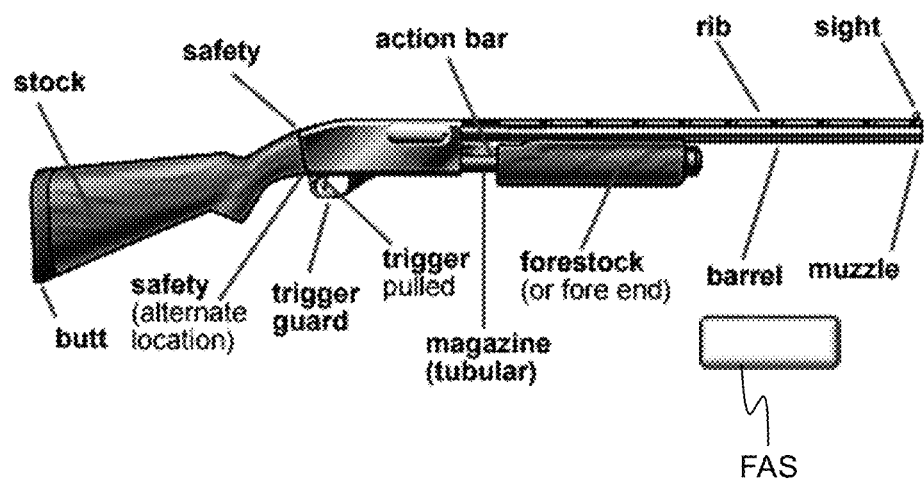
FIG. 4 is a side view of a shotgun, according to an embodiment.

FIG. 4 is a side view of a firearm comprising a shotgun, according to an embodiment. Various parts and portions are named in the figure. A schematic representation of an FAS, at least a portion of which may be located on or in the firearm, is illustrated.

Figure 5:
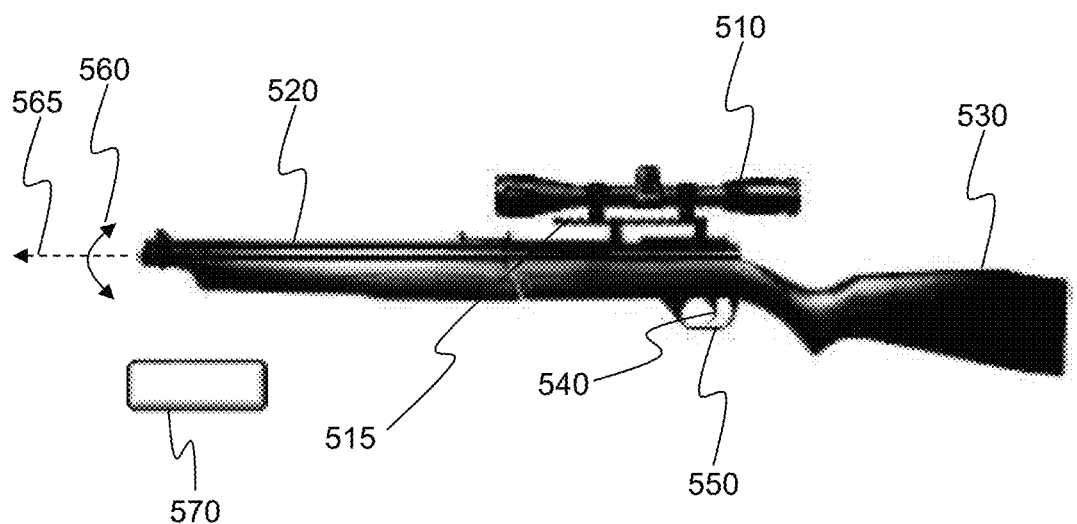
FIG. 5 is a side view of a rifle with a scope, according to an embodiment.

FIG. 5 is a side view of a firearm comprising a rifle with a scope 510 mounted on a bracket 515, according to an embodiment. The rifle includes a barrel 520, trigger guard 550, trigger 540, and stock 530, for example. Arrow 560 indicates a possible rotation about an aim direction 565. Rotations orthogonal to that illustrated are possible as well. A schematic representation of an FAS 570, at least a portion of which may be located on or in the firearm, is illustrated.

Figure 6A:
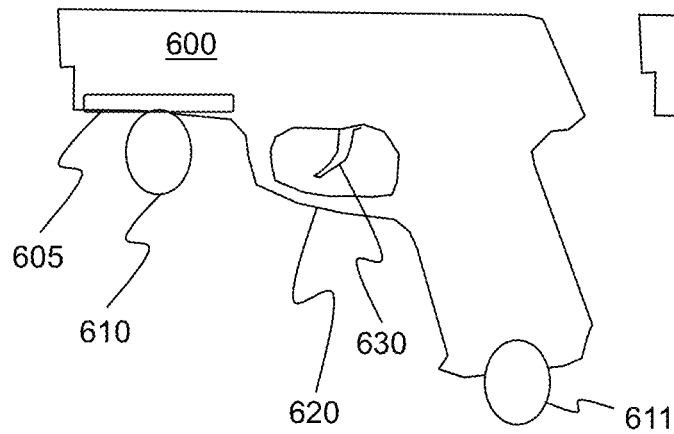
FIGS. 6A and 6B are schematic side-view diagrams illustrating a handgun with an attached aim-detector-safety-device (ADSD), according to an embodiment.
Figure 6B:
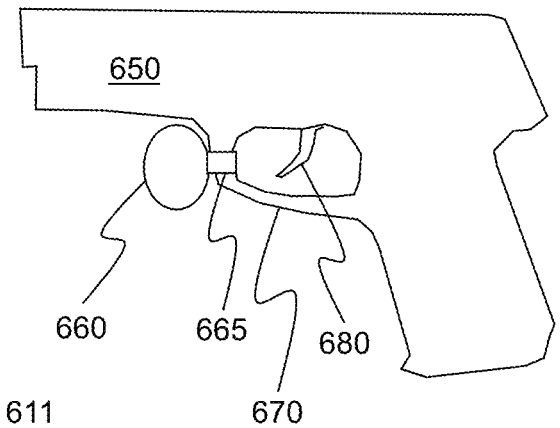
Figure 6C:
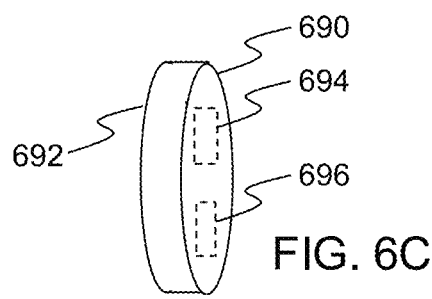
FIG. 6C is a schematic perspective view of a 3D sensor, according to an embodiment.

FIGS. 6A and 6B are schematic side-view diagrams illustrating a firearm comprising a handgun 600 with an attached FAS/FAS sensor, according to an embodiment. Either an FAS, one or more sensors of the FAS, or both may be indicated by "FAS/FAS sensor". For example, handgun 600 may include a trigger guard 620, a trigger 630, and a mounting rail 605. An FAS/FAS sensor 610 may be mounted on any portion of a firearm, such as on rail 605, magazine (FIG. 1), grip (FIG. 1), and so on, for example. Though an FAS/FAS sensor is depicted as having an oval shape, this is only schematic, and an FAS/FAS sensor may have any shape, such as rectangular, partially angled, etc. Size may be anywhere from a cubic centimeter to a cubic inch or more, and claimed subject matter is not so limited. A mounting rail 605, such as on a Glock (Glock manufacturer in Austria), for example, may be present on some pistols and not others. In another implementation, an FAS/FAS sensor 611 may be attached to a magazine, for example.

Handgun 650, for example, need not include a mounting rail. Handgun 650 may include a trigger guard 670, and a trigger 680. An FAS/FAS sensor 660 may include a bracket or clamp 665 or other connection means to be mounted on any portion of a firearm, such as on trigger guard 670. In another implementation, an FAS/FAS sensor need not include a mounting bracket or such hardware: an FAS/FAS sensor may be self-adhesive, or associated sensors (e.g., 3D sensor, touch sensor, etc.) may be self-adhesive.

FIG. 6C is a schematic perspective view of a 3D sensor 690, according to an embodiment, and may be relatively small and mountable on a firearm (e.g., a rifle or handgun, such as 600) or another object (e.g., scope, telescope mount, flashlight, brackets, rails, sights, magazines, clips, laser mounts, foregrips, butt stocks, bi-pods, and so on) that is mounted on the firearm. The 3D sensor may include one or more accelerometers or inertial sensors 694 and/or a transmitter 696 to transmit wireless electronic signals to an FAS. For example, a 3D sensor may be about the size of a thick coin (e.g., about 2 centimeters diameter and about 0.5 or 1.0 centimeters thick), or about the size of a small cube (e.g., about 2.0 cubic centimeters), just to give a few examples. Of course, a sensor may have any dimensions, and claimed subject matter is not so limited to any particular sizes or shapes. A 3D sensor may include a self-adhesive portion 692 so that the 3D sensor may be affixed to a portion of a firearm using an adhesive, such as illustrated in FIG. 6C. Similarly, an FAS may include a self-adhesive portion so the FAS may be affixed to a firearm. In one implementation, a 3D sensor may include a clamp to clamp onto a portion of a firearm.

Figure 7:
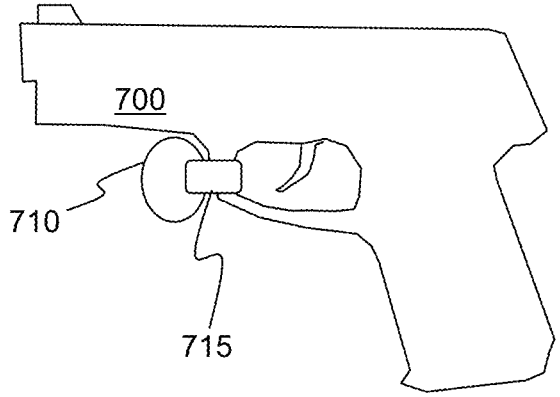
FIG. 7 is a schematic side-view diagram illustrating a handgun with an attached ADSD that includes a touch sensor, according to an embodiment.

FIG. 7 is a schematic side-view diagram illustrating a firearm comprising a handgun 700 with an attached FAS/FAS sensor 710 that includes a finger trigger rest pad comprising a touch sensor 715, according to an embodiment. (A clamp or bracket may be concealed by touch sensor 715 in FIG. 7). Touch sensor 715 may comprise any material such as a metal or semiconductor, and may use capacitive techniques to detect touch, such as by a trigger finger of a user, for example. In one implementation, a trigger of a firearm may be manufactured so that the trigger may sense touch. In such a case, an electronic signal may be generated by the trigger to indicate whether or not the trigger is being touched. In another implementation, a trigger sensor may measure rate of trigger pull, length of held trigger position, and so on. Such measurements may be converted to electronic signals (which may be wireless signals) so that a processor receiving the signals may determine trigger pull consistencies and/or irregularities of a shooter.

Figure 8:
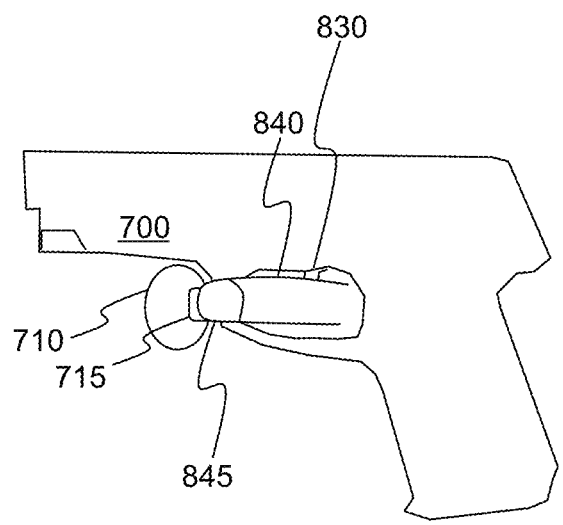
FIG. 8 is a schematic side-view diagram illustrating a handgun with an attached ADSD that includes a touch sensor showing a finger touching the touch sensor, according to an embodiment.

FIG. 8 is a schematic side-view diagram illustrating handgun 700 with attached FAS/FAS sensor 710 that includes touch sensor 715, showing a trigger finger 840 touching the touch sensor, according to an embodiment. Fingernail 845 of trigger finger 840 is illustrated for reference. In the finger position illustrated in the figure, trigger finger 840 may be touching touch sensor 710 and therefore may not be touching trigger 830. If the user (e.g., shooter) chooses to fire handgun 700, then the user may remove his trigger finger 840 from the touch sensor and place trigger finger 840 on trigger 830. Device 710 may detect that trigger finger 840 is no longer touching touch sensor 715. An assumption or determination may then be made by FAS/FAS sensor 710 that there is a likelihood that a user has his trigger finger on the trigger, for example.

Figure 9:
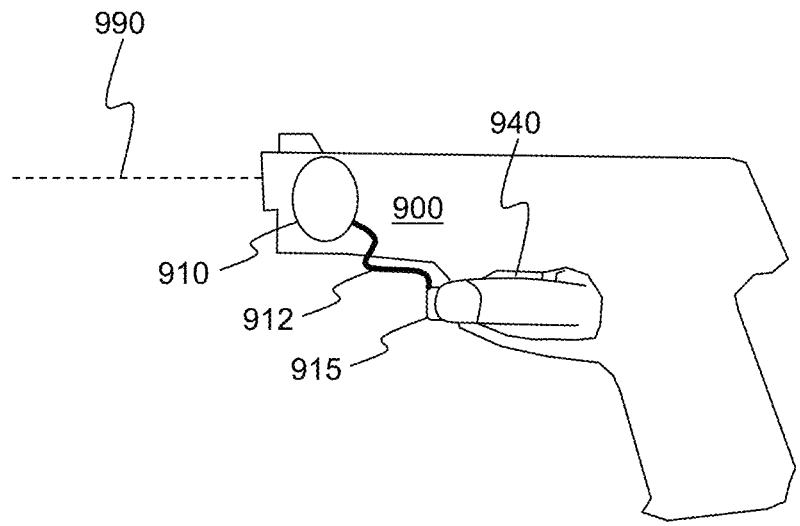
FIG. 9 is a schematic side-view diagram illustrating a handgun with an attached ADSD and wiring for communication with a remote touch sensor, showing a finger touching or near the touch sensor, according to an embodiment.

FIG. 9 is a schematic side-view diagram illustrating a handgun 900 with an attached FAS 910 and wiring 912 for communication with a remote touch sensor 915, showing a finger 940 touching or near the touch sensor, according to an embodiment. An axis 990 of handgun 900 is illustrated for reference. This situation may be similar to that illustrated in FIG. 8, except that FAS 910 may be located at a portion of a firearm different from a location of a touch sensor. A wire, which may comprise any number of individual conductors, for example, may be used for electronic communication between FAS 910 and touch sensor 915. In one implementation, such electronic communication between FAS 910 and touch sensor 915 may be performed via wireless communication in lieu of wiring 912, for example. Such electronic communication between an FAS and a touch sensor may be performed via wireless or wired communication of a handgun or rifle, and distances between an FAS and touch sensor may range from millimeters to several feet, for example.

Figure 10:
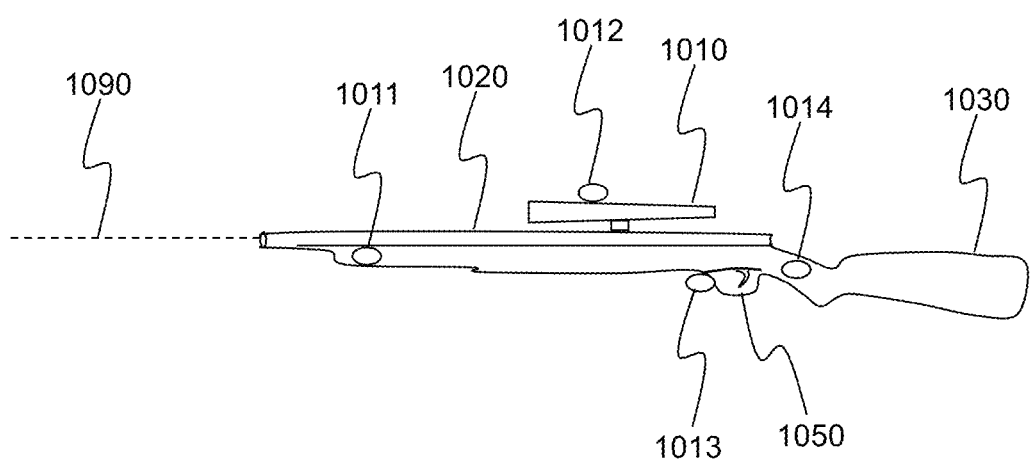
FIG. 10 is a schematic side-view diagram illustrating several possible locations of attachment of a ADSD on a rifle, according to an embodiment.

FIG. 10 is a schematic side-view diagram illustrating several possible locations of attachment of an FAS/FAS sensor on a rifle 1000, according to an embodiment. An axis 1090 of rifle 1000 is illustrated for reference. For example, an FAS/FAS sensor may be located at 1011, at the forestock or under the barrel 1020 of rifle 1000. Or an FAS/FAS sensor may be located at 1012, on a scope 1010 of rifle 1000. Or an FAS/FAS sensor may be located at 1013, on or near trigger guard 1050 of rifle 1030. Or an FAS/FAS sensor may be located at 1014, at a portion of the stock 1030 of rifle 1000. If a touch sensor is used with an FAS in FIG. 10, then a wire may extend from a touch sensor at a region of the trigger guard 1050 to any of the locations where the FAS may be mounted to rifle 1000, for example. Or wireless communication may be used between the touch sensor and the FAS.

Figure 11:
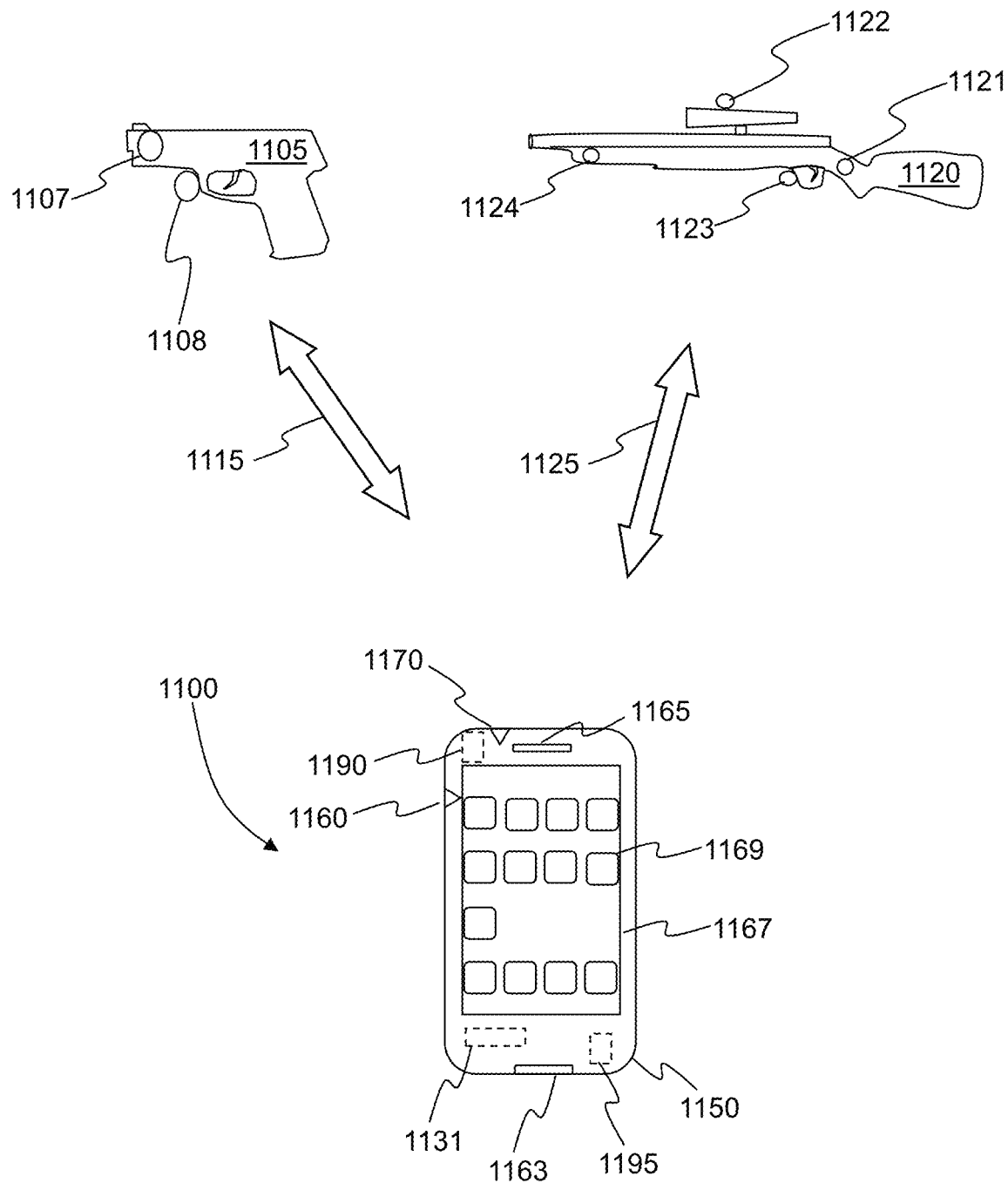
FIG. 11 is a schematic diagram illustrating several possible locations of attachment of a sensor for an ADSD on a rifle and a handgun, according to embodiments.

FIG. 11 is a schematic diagram illustrating several possible locations of attachment of a sensor for an FAS on a rifle and a handgun, according to embodiments. An FAS need not be located on a firearm. For example, an FAS may be located remotely from a firearm (e.g., in a user's pocket several feet away, or further), wherein the FAS uses one or more position sensors mounted on the firearm. For example, position sensors may comprise one or more accelerometers, which may be of any size, such as the size of a coin. Accordingly, a number of example locations of where a position sensor may be mounted on a firearm are illustrated in FIG. 11. A position sensor 1107 may be located at 1107 or 1108 on handgun 1105. A position sensor may be located at 1121, 1122, 1123, or 1124 on rifle 1120. Position sensors may wirelessly communicate with an FAS 1100, as indicated by arrows 1115 and 1125. In one implementation, an FAS may comprise a server, computer, or laptop, or other similar electronic device. In another implementation, an FAS may comprise a smartphone, mobile phone, touch pad, laptop, or other portable (or non-portable) electronic device. Herein, a "smartphone" means a portable electronic device comprising a processor, memory, phone, or other functional components (e.g., camera, and so on). In some example embodiments described below, FAS 1100 is considered to comprise a smartphone for illustrative purposes, but claimed subject matter is not so limited. Smartphone 1100 may comprise speaker 1165, touchscreen 1167, softkeys or adjustment sliders 1169 displayed in touchscreen 1167, or a connector (e.g., for battery charging or other functions) 1163. Though details of a smartphone are given, FAS 1100 may comprise another type of electronic device, and claimed subject matter is not limited in this respect. FAS 1100 may comprise an input port 1160 to receive signals representative of position of a firearm, as measured by position sensors attached to the firearm, for example. In some implementations, an input port may comprise a wireless receiver (e.g., Bluetooth) or a mini- or micro-USB port or other wired connection to connect non-wirelessly between position sensors and FAS 1100. In one implementation, FAS 1100 may wirelessly receive signals from position sensors via a receiver/transmitter 1190 and store representations of the signals in memory 1195, for example.

An output port 1170 may comprise a wireless transmitter, mini- or micro-USB port or other wired connection, or a headphone jack (e.g., monaural or stereo). The device may further comprise electronics 1131 configured to perform processes of detecting a shooter's aim direction of a firearm and initiating a warning of an aim violation. For example, electronics 1131 may comprise a processor configured to execute code to perform processes, such as 1700, described herein. FAS 1100 may be capable of monitoring positions, aim directions, and so on of more than one shooters' firearm at a time, for example, and claimed subject matter is not limited in this respect. For example, FAS 1100 may be able to keep track of more than one shooters' firearm at a time, and maintain respective data associated with individual firearms.

FAS 1100, comprising a Smartphone, for example, may include an application (e.g., executable code) to enable the Smartphone to perform tasks and process, such as 1700. FAS 1100 may further communicate with a touch sensor mounted on a firearm (or touch sensors mounted on multiple firearms), in addition to position sensors mounted on the firearm (or firearms). As mentioned above, an FAS need not involve a touch sensor, but if an FAS does involve a touch sensor, a Smartphone operating as an FAS may wirelessly receive signals from a touch sensor that indicate whether a user's trigger finger is touching the sensor.

In the embodiment described above, a shooter may operate a firearm that includes a position sensor mounted on the firearm. Then an FAS may be placed in a pocket of the shooter or on a person near the shooter (e.g., a shooting instructor). Though a Smartphone was described above in example embodiments, an FAS need not comprise a Smartphone, but may comprise an electronic device dedicated to operating as an FAS, for example.

Figure 12:
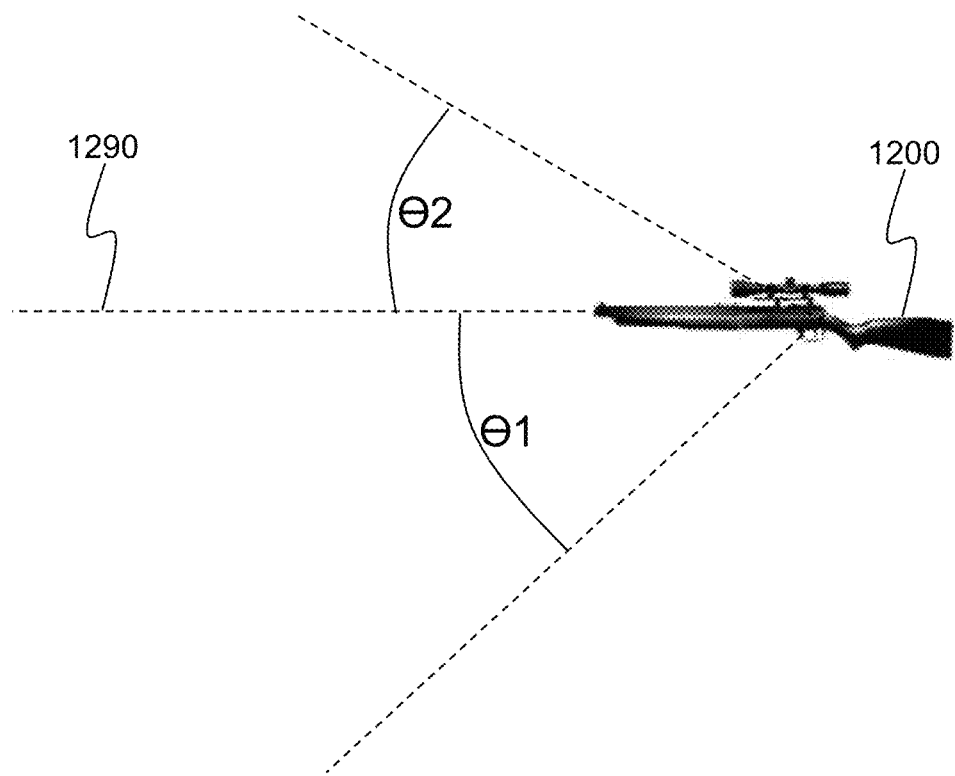
FIG. 12 is a schematic side-view diagram of a rifle and angles subtended from a reference aim direction, according to an embodiment.

FIG. 12 is a schematic side-view diagram of a rifle 1200 and angles subtended from horizontal or a reference aim direction 1290, according to an embodiment. For example, angle θ1 may comprise an azimuthal angle above horizontal (as defined by gravity), and θ2 may comprise an azimuthal angle below horizontal. Accordingly, for example, if θ1 is 30 degrees, then the shooter's aim direction of rifle 1200 may be 30 degrees below horizontal. As another example, if θ2 is 90 degrees, then the aim direction of the shooter's rifle 1200 may be straight up in the air, at 90 degrees above horizontal. A position sensor may sense such azimuthal angles to enable an FAS to determine aim direction of a firearm.

Figure 13:
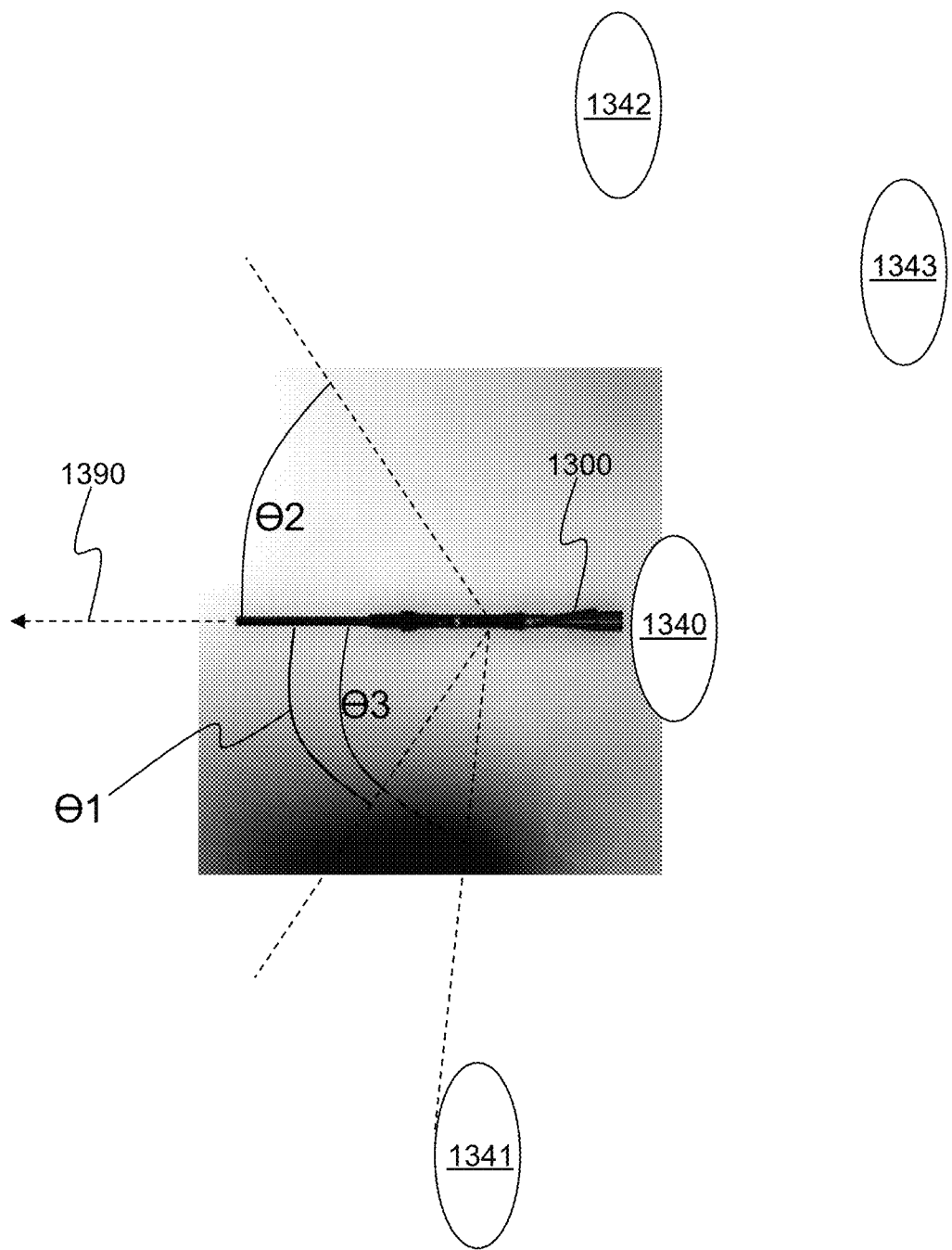
FIG. 13 is a schematic top-view diagram of a rifle and angles subtended from a reference aim direction, according to an embodiment.

FIG. 13 is a schematic top-view diagram of a rifle 1300 and angles subtended from a reference aim direction, according to an embodiment. For example, angle θ1 may comprise a horizontal (as defined by gravity) angle to the left (looking downward) of a reference aim direction 1390, and θ2 may comprise a horizontal angle to the right of the reference aim direction 1390. Reference aim direction may be determined or defined by any of a number of ways, such as manually defined by a user (e.g., shooter) or may be set as the direction of a gunshot, wherein the gunshot is detected and the direction of the firearm at the time of the gunshot may be considered or defined to be the reference aim direction. Accordingly, for example, if θ1 is 30 degrees, then the aim direction of rifle 1300 may be 30 degrees to the left of a target. As another example, if θ2 is 90 degrees, then the aim direction of rifle 1300 may be toward the right of the shooter, at 90 degrees to the right of the target. A position sensor may sense such horizontal angles to enable an FAS to determine aim direction of a firearm.

An FAS may use a combination of azimuthal and horizontal angles to define a shooter's aim direction of a firearm. Accordingly, for example, an aim direction of a firearm may be defined using both azimuthal and horizontal angles. A shooter's aim violations may be defined by the combination of both azimuthal and horizontal angles—merely one of these angles may not be sufficient to determine whether a firearm is pointed in a dangerous direction, for example. In an implementation, for an individual value of azimuthal angle, there may be a range of horizontal angles that may be considered in a safe zone for particular criteria. For example, at azimuth of zero degrees (e.g., firearm at horizontal aim direction), safety criteria may specify that a safe range of horizontal angles is between 70 degrees to the left and 70 degrees to the right. However, at azimuth of 80 degrees below horizontal, safety criteria may specify that a safe range of horizontal angles is between 90 degrees to the left and 90 degrees to the right. For example, the range of safe horizontal angles may increase as a firearm is pointed increasingly downward.

Different shooting venues (e.g., different shooting clubs, shooting ranges, open area, outdoors, and so on) may abide by different safety criteria. For example, one shooting club may forbid a shooter's firearm to be pointed upward as a "neutral" position, preferring instead to have a firearm pointed downward toward the ground. On the other hand, another shooting club may allow a shooter to point a gun upward or downward as a "neutral" position. One shooting range may prefer a shooter's firearm aim to be limited to a horizontal angular range within 60 degrees of a target, while another shooting range may relax such a limitation to a horizontal angular range up to 80 degrees of a target, just to name some examples. An FAS may store in its memory multiple safety criteria for a number of types of venues. A user may manually select the proper safety criteria for the current shooting venue. In another implementation, an FAS may automatically (e.g., without user input or action) select proper safety criteria by determining where the FAS is located. For example, an FAS, for example if the FAS comprises a Smartphone, may determine its location using a satellite position system, WiFi, Bluetooth, wireless signal strength heatmaps, triangulation of access point signals, and so on. The FAS may correlate its determined position with locations of particular venues stored in its memory. Thus, for example, an FAS may determine that it is located at particular latitude/longitude coordinates, find a match of these coordinates with a location of a shooting range, and select safety criteria for the shooting range. In another implementation, an FAS may receive wireless signals transmitted by an access point or other transmitter at a venue: the wireless signals may comprise information regarding safety criteria used at the venue. The FAS may download the safety criteria to its memory or may receive a code that indicates to the FAS which criteria (which may already be stored in memory of the FAS) to use for the venue.

Figure 14:
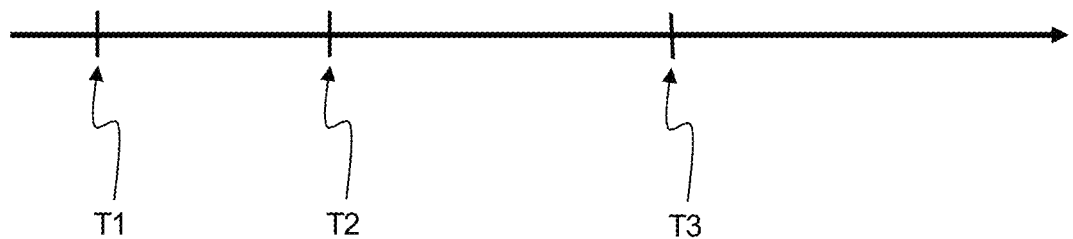
FIG. 14 is a time line of a process of detecting aim direction of a firearm and initiating a warning of an aim violation, according to an embodiment.

FIG. 14 is a time line of a process of detecting aim direction of a firearm and initiating a warning of an aim violation, according to an embodiment. For example, at T1, an FAS may detect a gunshot, and at about this time may determine a shooter's aim direction of the firearm and thus define that direction as a reference aim direction. Thereafter, the FAS may continuously, from time to time, or at time intervals sense a shooter's current aim directions of the firearm. Current aim directions may be compared to the reference aim direction to monitor whether or not the firearm is aimed in a safe zone, according to safety criteria. If the firearm is outside such safe zones, then an alarm may be initiated to alert the shooter or persons nearby. The alarm may stop sounding if the firearm aim direction returns to the safe zone. Or, in other implementations, the alarm may continue until a user presses a button to hush or reset the alarm, for example.

In one implementation, subsequent shots may be fired, but the reference aim direction will not change. In another implementation, the reference aim direction may be reset with each subsequent shot, or perhaps every third shot, or every tenth shot, etc., just to give a few examples. Thus, at T2, a subsequent shot may be used to reset the reference aim direction: the new reference aim direction may comprise the aim direction at the time of the subsequent gunshot, for example. At T3, another subsequent shot may again be used to reset the reference aim direction.

Figure 15:
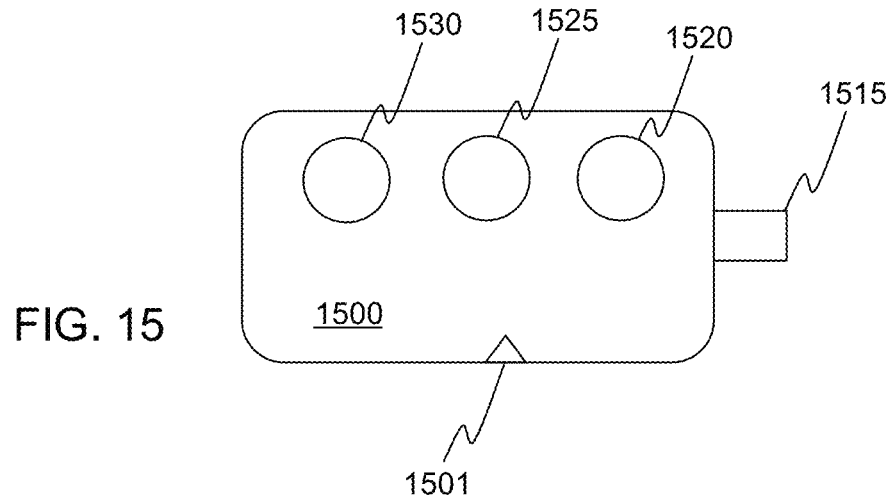
FIG. 15 is a schematic view of a ADSD including a mounting clamp or other means for mounting to a firearm, according to an embodiment.

FIG. 15 is a schematic view of a FAS 1500 including a mounting clamp 1515 or other means for mounting to a firearm, according to an embodiment. Of course, such a clamp or other mounting means may be located on any portion of FAS 1500. FAS 1500 may include one or more buttons 1520 to allow a user to reset reference aim direction, select safety criteria, hush or test alarms, and so on. An output 1525 may comprise an alarm, which may in turn comprise a speaker or a light, such as a light emitting diode (LED), for example. Output 1525 may also comprise a display or LED indicator lights to allow a user to determine various status issue of the FAS, such as battery life, on/off, safety criteria being used, memory contents, and so on. Input 1530 may comprise a microphone to receive sound or shock waves from gunshots, sounds of a round being loaded into a chamber of a firearm, and so on. In one implementation, input 1530 may comprise an accelerometer, which may be used by a processor or other electronics to detect shock waves from a gunshot. A PZT may also be used by a processor to detect shock waves also. Other sensor types may be used, and claimed subject matter is not so limited. FAS 1500 may include a USB port 1501 for transferring electronic signals representing shooting history, shooting statistics, safety criteria, and so on.

Figure 16:
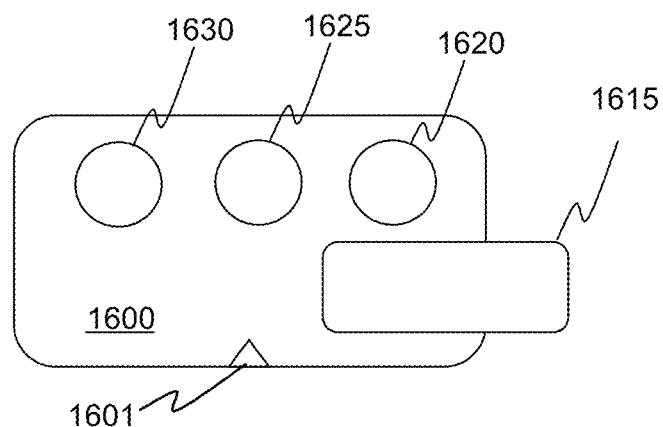
FIG. 16 is a schematic view of a ADSD including a touch sensor, according to an embodiment.

FIG. 16 is a schematic view of a FAS 1600 including a touch sensor 1615, according to an embodiment. In other embodiments, a touch sensor may be located remotely from an FAS. In one example, a touch sensor may be located at or near a trigger guard of a firearm and an FAS may be located on another portion of the firearm. The FAS and the touch sensor may communicate with one another via a wire or wireless signals, for example. In another example, a touch sensor may be located at or near a trigger guard of a firearm and an FAS may be located remote from the firearm, such as on a table surface or in a pocket of a shooter of nearby person. The FAS and the touch sensor may communicate with one another via wireless signals, for example. In the case illustrated in FIG. 16, the touch sensor 1615 is attached to the FAS 1600.

As explained for FAS 1500, FAS 1600 may include one or more buttons 1620 to allow a user to reset reference aim direction, select safety criteria, hush or test alarms, and so on. An output 1625 may comprise an alarm, which may in turn comprise a speaker or a light, such as a light emitting diode (LED), for example. Output 1625 may also comprise a display or LED indicator lights to allow a user to determine various status issue of the FAS, such as battery life, on/off, safety criteria being used, memory contents, and so on. Input 1630 may comprise a speaker to receive sound or shock waves from gunshots, sounds of a round being loaded into a chamber of a firearm, and so on. FAS 1600 may include a USB port 1601 for transferring electronic signals representing shooting history, shooting statistics, safety criteria, and so on.

Figure 17:
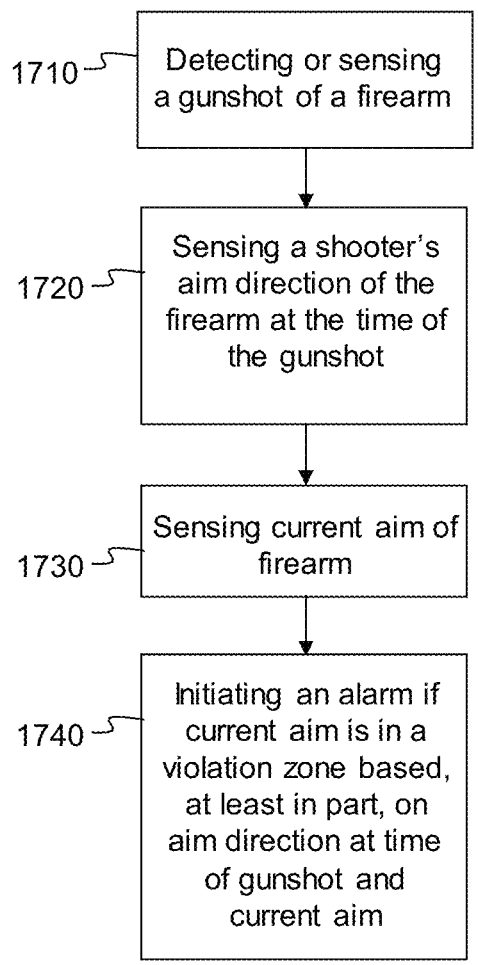
FIG. 17 is a flow diagram of a process for detecting aim direction of a firearm and initiating a warning of an aim violation.

FIG. 17 is a flow diagram of a process for detecting aim direction of a firearm and initiating a warning of an aim violation. At block 1710, a sensing device, such as an accelerometer mounted on one or more locations on a firearm, may be used to detect or sense a gunshot performed by the firearm. Other gunshots performed by other firearms in the area, for example, may be ignored. A gunshot from the firearm having the sensor may be sensed at a higher intensity compared to a gunshot from another firearm, for example. Also, sound signatures of gunshots from respective firearms may be recognizable by an FAS. At block 1720, a sensing device, such as an accelerometer mounted on one or more locations on a firearm, may be used to detect or sense a shooter's aim direction of the firearm when the gunshot was detected. This aim direction at the time of the gunshot may then be used as a reference aim direction. At block 1730, the firearm aim direction may be sensed at time intervals, such as some number per second (e.g., sample rate at once per second, twice per second, ten times per second, or more or less frequently). Such sensing may be automatic, with no user action, for example. At block 1740, an alarm may be initiated, for example by a processor or other electronics, if an aim direction is sensed or determined (e.g., by a processor or other electronics using one or more sensors, such as an accelerometer) to violate safety criteria, which may specify, for example, ranges of aim angles that are safe or are not safe. Angles of aim direction may be determined relative to the reference aim direction, for example.

FIGS. 18-23 are schematic side views of a round and a firing pin and actuating means of a firearm to defeat or allow discharge of the round, according to embodiment. It may be desirable to defeat a shooting capability of a firearm if the firearm is aimed in a direction that violates safety criteria.

Figure 18:
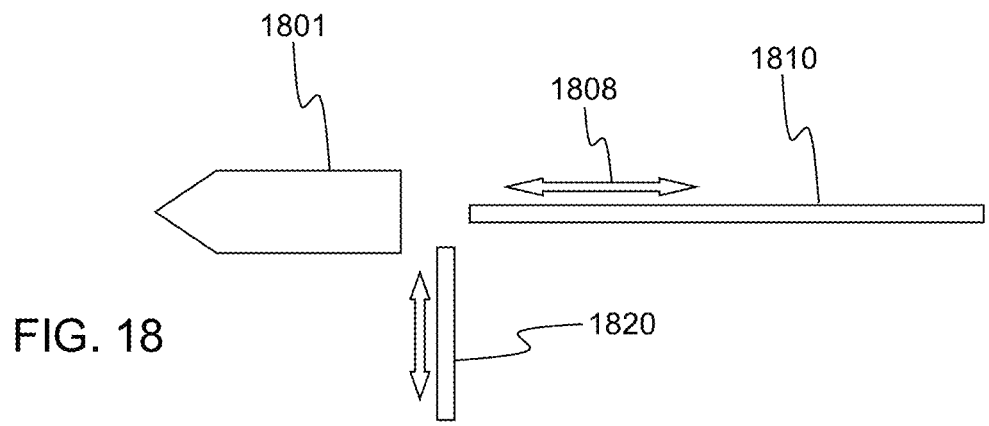
FIGS. 18-23 are schematic side views of a round and a firing pin and actuating means to defeat or allow discharge of the round, according to embodiments.

In FIG. 18, a firing pin 1810 of a firearm may move according to arrow 1808 in a direction so as to strike round (e.g., bullet) 1801. A blocking element 1820 may move in a direction so as to block or otherwise prevent firing pin 1810 from striking round 1801, thus preventing discharge of the firearm.

Figure 19:
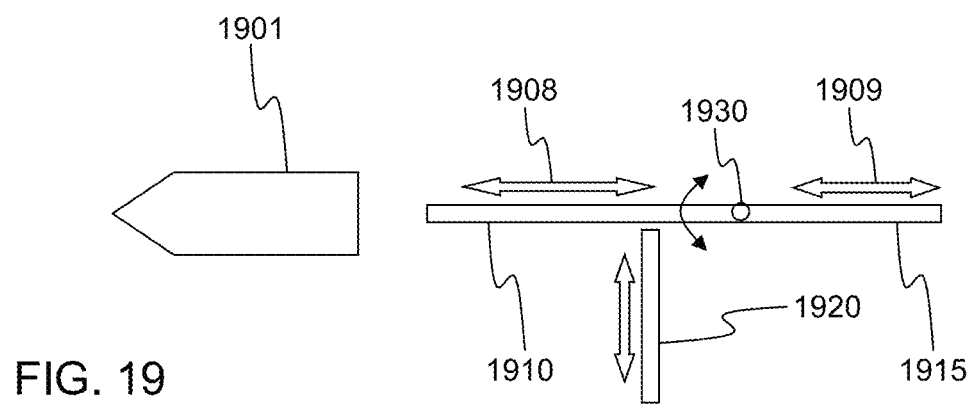
Figure 20:
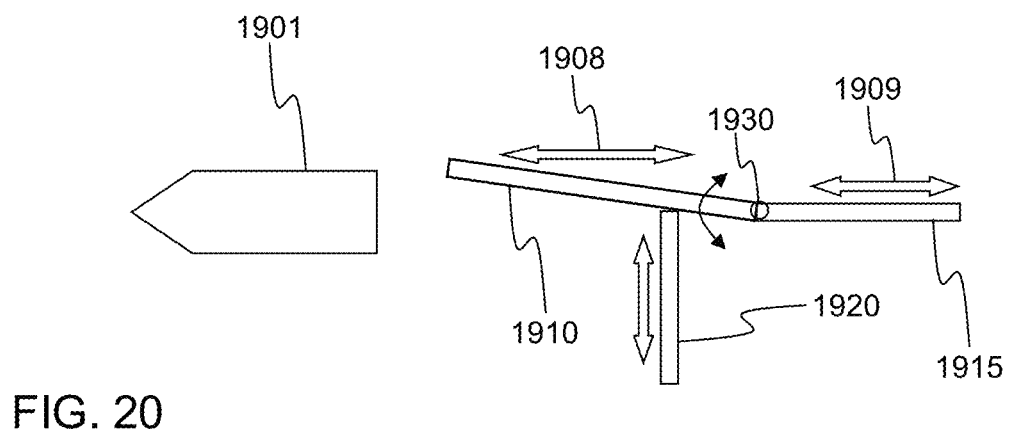

In FIG. 19, a firing pin of a firearm may comprise two or more portions, such as first portion 1910 and second portion 1915. The firing pin may move according to arrows 1908 and 1909 in a direction so that first portion 1910 may strike round (e.g., bullet) 1901. First portion 1910 may rotate relative to second portion 1915 about an axis or pin 1930, for example. A displacement element 1920 may move in a direction so as to rotate first pin portion 1910. Such rotation may lead to first pin portion no longer being in an alignment to strike round 1901 so as to discharge the round. Thus, displacement element 1920 may prevent firing pin portion 1910 from striking round 1901, thus preventing discharge of the firearm. FIG. 20 shows firing pin portion 1910 rotated and out of alignment for striking a part of round 1901 so as to discharge the round. An element such as 1920 may comprise a mechanical device, involving springs, gears, and so on. Also, an element such as 1920 may comprise a PZT that may change one or more of its dimensions (e.g., expand or contract) upon or after receiving an electrical signal, for example.

Figure 21:
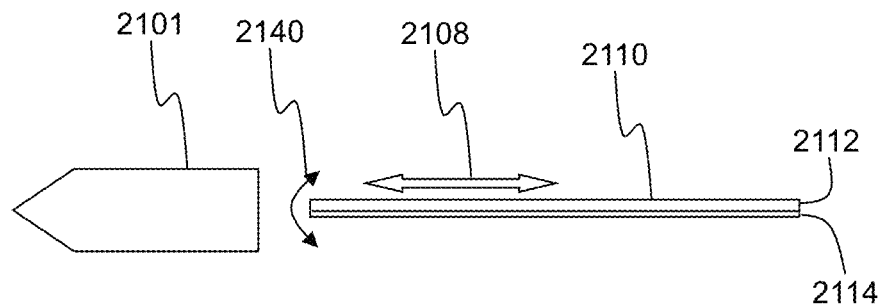
Figure 22:
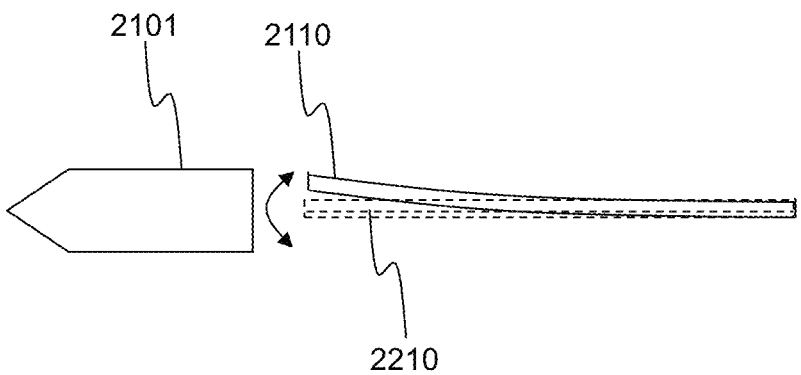

In FIG. 21, a firing pin 2110 of a firearm may comprise a bi-material (e.g., bimetal) thermocouple including two or more portions, such as first portion 2112 and second portion 2114. The firing pin may move according to arrow 2108 in a direction so that the firing pin may strike round (e.g., bullet) 2101. If first portion 2112 comprise a material with a different rate of thermal expansion compared to that of second portion 2114, then firing pin 2110 may bend or distort (such as indicated by arrow 2140) as illustrated in FIG. 22, for example. Number 2210 indicates an original shape of firing pin 2110 before bending. Such bending or distortion may lead to firing pin 2110 no longer being in an alignment to strike round 2101 so as to discharge the round. Thus, applying electricity to heat up the portions of firing pin 2110 may prevent firing pin 2110 from striking a particular portion (whether center-fire or rim-fire rounds are used) of round 2101, thus preventing discharge of the firearm.

Figure 23:
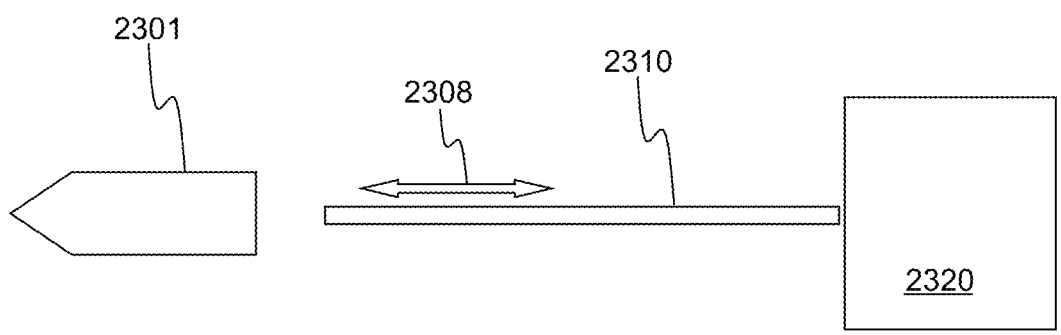

In FIG. 23, a firing pin 2310 of a firearm may move according to arrow 2308 in a direction so as to strike round (e.g., bullet) 2301. The embodiments illustrated in FIGS. 18-22 show examples of how mechanical manipulation may prevent a round from being discharged, even if a trigger of the firearm is pulled. Such examples of mechanical manipulation may be applied to a firing pin or any other part of a firing assembly of a firearm. There are many types of firearms, so different firing assemblies may require different techniques to prevent discharge of a round. Accordingly, block 2320 schematically represents example mechanisms or techniques that may be applied to any part of a firing mechanism of a firearm, in addition to the firing pin portions illustrated in the figures above. Claimed subject matter is not limited to any particular mechanics or techniques.

Figure 24:
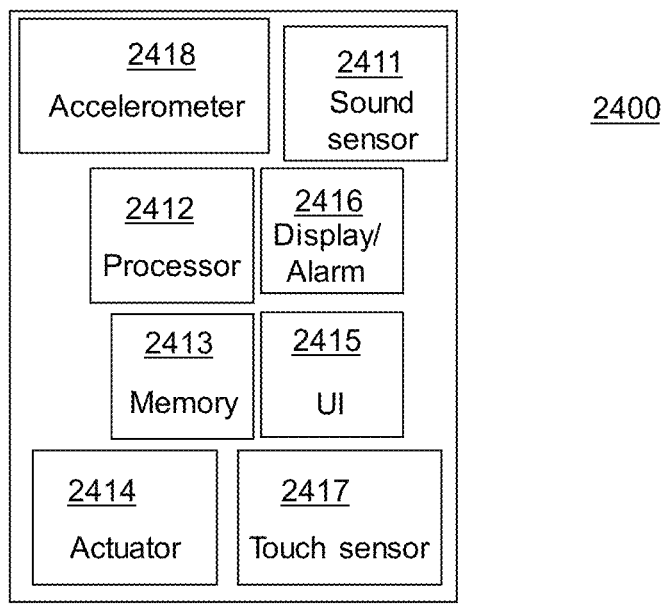
FIG. 24 is a schematic block diagram illustrating a system for performing a safety process associated with a firearm, according to another embodiment.

FIG. 24 is a schematic block diagram illustrating a system 2400 for performing a safety process associated with a firearm, such as process 1700, for example, according to an embodiment. For example, at least a portion of system 2400 may comprise an FAS. System 2400 may comprise a sound or shock sensor 2411, a processor 2412, a memory 2413, an actuator 2414, a user interface (UI) 2415, a display/alarm 2416, a touch sensor 2417, and an accelerometer 2418. System 2400 may comprise further elements or may comprise fewer elements than are illustrated in FIG. 24, for example. Also, any elements of system 2400 may be co-located with one another or may be remotely located from one another. For example, a touch sensor may be remotely located from a processor or accelerometer, etc.

An accelerometer 2418 may be used to sense or detect orientation or position of a firearm. An accelerometer 2418 may also be used to sense kickback or shock from discharging a round (e.g., gunshot). For example, accelerometer 2418 may sense a position displacement of a firearm resulting from the firearm firing a round. Processor 2412 may use electronic signals generated by accelerometer 2418 to determine that the firearm discharged a round. In some implementations, sound sensor 2411 may be used by a processor to sense a gunshot using sound signatures stored in memory 2413, for example. In some implementations, accelerometer 2418 and sound sensor 2411 may comprise a single element, such as if sound sensor 2411 detects shock waves, for example. In one implementation, an FAS, which may comprise a portion of system 2400, may learn a sound signature of gunshots. For example, a user may set a particular operation mode where the FAS "listens" for a gunshot and records the sound signature of the gunshot. The FAS may quantify the sound into a signature that is stored in memory and used to compare with subsequent gunshot sounds, for example. In another implementation, an FAS may learn a sound signature of a round being loaded into a chamber of a firearm. For example, a user may set a particular operation mode where the FAS "listens" for a round being loaded into a chamber of a firearm and records the sound signature of the round being loaded. The FAS may quantify the sound into a signature that is stored in memory and used to compare with subsequent sounds of rounds being loaded, for example.

Touch sensor 2417 may comprise a trigger finger rest pad and may detect whether a finger is touching it. Touch sensor 2417 may provide electrical signals to processor 2412 that indicate to the processor whether or not a finger is touching the touch sensor. Processor 2412 may then execute code to respond any of a number of particular ways. For example, if an aim direction violates safety criteria but a finger is touching touch sensor 2417, which may mean that there is no finger on a trigger, then processor 2412 need not initiate an alarm. On the other hand, if an aim direction violates safety criteria and a finger is not touching touch sensor 2417, which may mean that there is a finger on a trigger, then processor 2412 may initiate an alarm. In one implementation, touch sensor 2417 may comprise part of a trigger so that a signal from such a touch sensor may indicate whether a finger is touching the trigger or not.

Display/alarm 2416 may comprise an audio alarm, such as a speaker. 2416 may also comprise one or more LEDs so that a visual alarm may comprise a lit LED, for example. Display/alarm 2416 may comprise a visual display, such as an LCD display, which may be used to display various things, such as battery level, system status, aim angle relative to a reference aim angle, number of shots fired (e.g., number of shots detected), and so on. If a portion of system 2400 comprises a smartphone, then Display/alarm 2416 may comprise a touchscreen display and speaker of the smartphone, for example.

Memory 2413 may store sound signatures, such as for rounds being loaded into a firing chamber of a firearm, gunshots from one or more firearms, and so on. Memory 2413 may also store safety criteria for a number of venues or circumstances. Memory 2413 may also store details of shooting history, for example.

A user interface 2415 may include a keypad, mouse, or touchscreen by which a user may provide operational instructions to system 2400. UI 2415 may comprise a visual display, such as an LCD display, which may be used to display various things, such as battery level, system status, aim angle relative to a reference aim angle, number of shots fired (e.g., number of shots detected), and so on. UI 2415 may also comprise buttons, switches, etc., such as buttons 1520 and 1620 illustrated in FIGS. 15 and 16, for example. If a portion of system 2400 comprises a smartphone, then UI 2415 may comprise a touchscreen display, for example.

An actuator 2414, which may be operated by processor 2412, may be used to manipulate a firing mechanism of a firearm so as to prevent the firearm from being able to fire a round. Some embodiments are illustrated in FIGS. 18-23, for example. Actuator 2414 may be located remotely from a remainder of system 2400, and may be powered by a battery. For example, actuator 2414 may be located in or near a firing mechanism of a firearm. A processor 2412 of system 2400 may communicate with remote actuator via wireless or wired communication, depending if the processor is also mounted to a portion of the firearm.

In one embodiment, at least a portion of system 2400 may record gunshots to develop a firing history. For example, time of day and aim direction of individual shots may be recorded and saved in memory to develop a shooting history. Aim violations may also be recorded to develop a history of aim violations, which may include time of day and aim angle of individual violations. In one implementation, for example, portions of system 2400 may comprise a smartphone, touchpad, laptop, etc. In one example, a smartphone, laptop, server, etc. may be used to monitor shooting of multiple shooters at the same time. For example, Bluetooth technology may be used to wirelessly transmit signals among multiple sensors respectively attached to multiple firearms and one or more FASs, comprising a server, laptop, or smartphone or dedicated unit. Acting as an FAS, a smartphone may be located remotely from a firearm, such as in a shooter's pocket, and so on. The smartphone may include a microphone comprising a sound or shock sensor 2411. An accelerometer 2418 may be located (e.g., attached) to the firearm. The accelerometer may communicate to the smartphone wirelessly. In one implementation, an initial gunshot may be used to set a reference aim direction. For example, the smartphone may detect a gunshot and also receive electronic wireless signals from an accelerometer attached on the firearm. A processor of the smartphone may set a reference aim direction based, at least in part, on the aim direction of the firearm at the time the gunshot was fired. The smartphone may detect subsequent gunshots from the firearm, identifying the gunshots, perhaps, by their sound signature. The smartphone may record the time of day of the individual gunshots and the aim direction of the individual gunshots. The aim direction may be ascertained since the smartphone may receive electronic wireless signals from the accelerometer (at some sampling rate) indicating orientation, and thus aim angle, of the firearm. The smartphone may save such measurements in memory 2413. Shooting history may be displayed via UI 2415, for example. Shooting history data may be uploaded from a smartphone via a micro-USB port or any other type of communication port, for example.

In one embodiment, an FAS, which may comprise at least a portion of system 2400, may record gunshots to develop a firing history. For example, time of day and aim direction of individual shots may be recorded and saved in memory to develop a shooting history. Aim violations may also be recorded to develop a history of aim violations, which may include time of day and aim angle of individual violations. An FAS may be located remotely from a firearm, such as in a shooter's pocket, and so on. The FAS may include a microphone comprising a sound or shock sensor 2411. An accelerometer 2418 may be located (e.g., attached) to the firearm. The accelerometer may communicate to the FAS wirelessly. In one implementation, an initial gunshot may be used to set a reference aim direction. For example, the FAS may detect a gunshot and also receive electronic wireless signals from an accelerometer attached on the firearm. A processor of the FAS may set a reference aim direction based, at least in part, on the aim direction of the firearm at the time the gunshot was fired. The FAS may detect subsequent gunshots from the firearm, identifying the gunshots, perhaps, by their sound signature. The FAS may record the time of day of the individual gunshots and the aim direction of the individual gunshots. The aim direction may be ascertained since the FAS may receive electronic wireless signals from the accelerometer (at some sampling rate) indicating orientation, and thus aim angle, of the firearm. The FAS may save such measurements in memory 2413. Shooting history may be displayed via UI 2415, for example. Shooting history data may be uploaded from an FAS via a USB port or any other type of communication port, for example.

In one embodiment, an FAS, which may comprise at least a portion of system 2400, may record gunshots to develop a firing history of multiple shooters at the same time. For example, time of day and aim direction of individual shots may be recorded and saved in memory to develop a shooting history of multiple users at the same time. Aim violations may also be recorded to develop a history of aim violations, which may include time of day and aim angle of individual violations. An FAS may be located remotely from multiple firearms, such as at an observer station of a shooting range, and so on. The FAS may include a microphone comprising a sound or shock sensor 2411. Accelerometers 2418 may be located (e.g., attached) to respective firearms. The accelerometers may communicate to the FAS wirelessly. Individual accelerometers may be identified by unique electronic serial numbers or other coding, for example. In one implementation, an initial gunshot of individual firearms may be used to set a reference aim direction for the respective individual firearms. For example, the FAS may detect a gunshot and also receive electronic wireless signals from an accelerometer attached on the firearm. A processor of the FAS may set a reference aim direction based, at least in part, on the aim direction of the firearm at the time the gunshot was fired. The FAS may detect subsequent gunshots from the particular firearm, identifying the gunshots, perhaps, by their sound signature. The FAS may record the time of day of the individual gunshots of individual firearms and the aim direction of the individual gunshots. The aim direction may be ascertained since the FAS may receive electronic wireless signals from the accelerometer (at some sampling rate) indicating orientation, and thus aim angle, of the firearm. The FAS may save such measurements in memory 2413. Shooting history of multiple shooters on multiple firearms may be displayed via UI 2415, for example. Shooting history data may be uploaded from an FAS via a USB port or any other type of communication port, for example.

Figure 25:
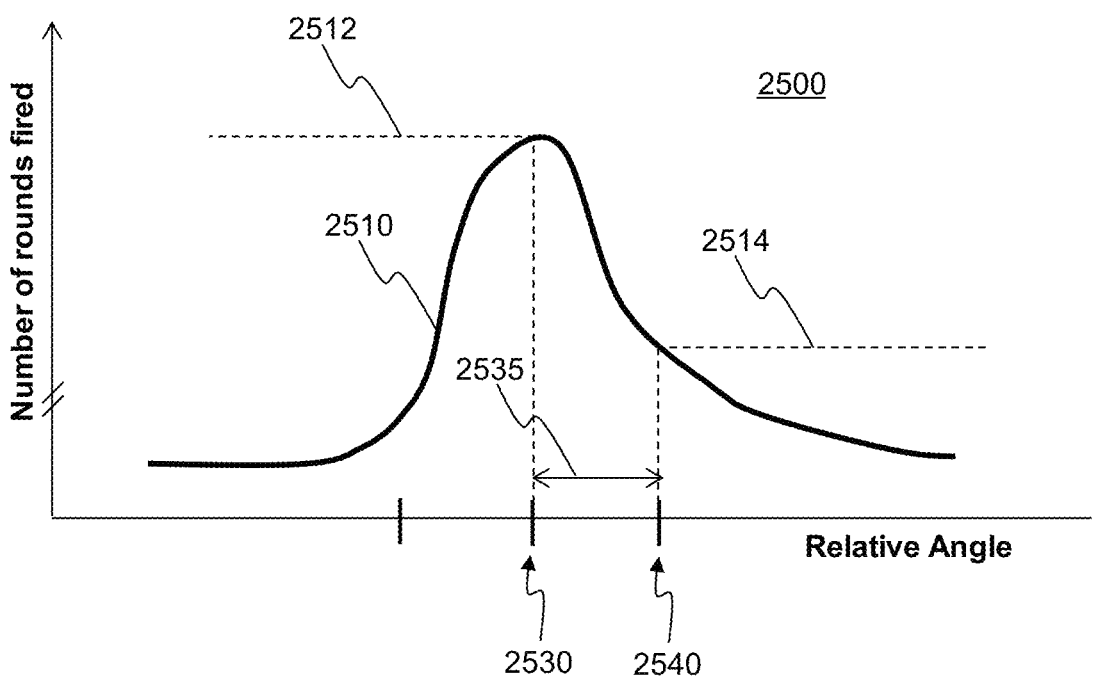
FIG. 25 is a distribution plot of aim direction, according to an embodiment.

FIG. 25 is a distribution plot 2510 of aim direction, according to an embodiment 2500. For example, plot 2510 may be produced from history data measured and recorded by a smartphone, as described above. As an example, plot 2510 may comprise one hundred data points comprising aim angle of the individual shots. For the plot, such aim angles may be referenced to a reference aim angle 2530. Plot 2510 may comprise a histogram of number of shots in angle range bins, for example. For instance, if a value 2512 comprise twenty, then plot 2510 indicates that twenty shots were fired while the firearm was aimed at the reference aim angle 2530. If a value 2514 comprises nine, then plot 2510 indicates that nine shots were fired while the firearm was aimed at an aim angle 2540, which may comprise an angle of displacement from the reference aim angle of 2535, for example.

In one implementation, which may be useful for practice aiming a firearm, an alarm may indicate if the firearm is aimed substantially toward a target. For example, after a reference aim direction is set and stored in memory, an LED may light if the aim direction is within a range of angles from the reference aim direction. For example, if the aim direction is within 2.0 degrees of the reference aim direction (which may be assumed to be the direction of a target), then an LED may light. Of course, other variables may be that an LED lights if aim direction is not in the angle range, etc. In one further implementation, a brightness of an LED may be based, at least in part, on aim direction relative to a reference aim direction. For example, the more true an aim is to a target, the brighter the LED may be. Of course, such details of system 2400 are merely examples, and claimed subject matter is not so limited.

Figure 26:
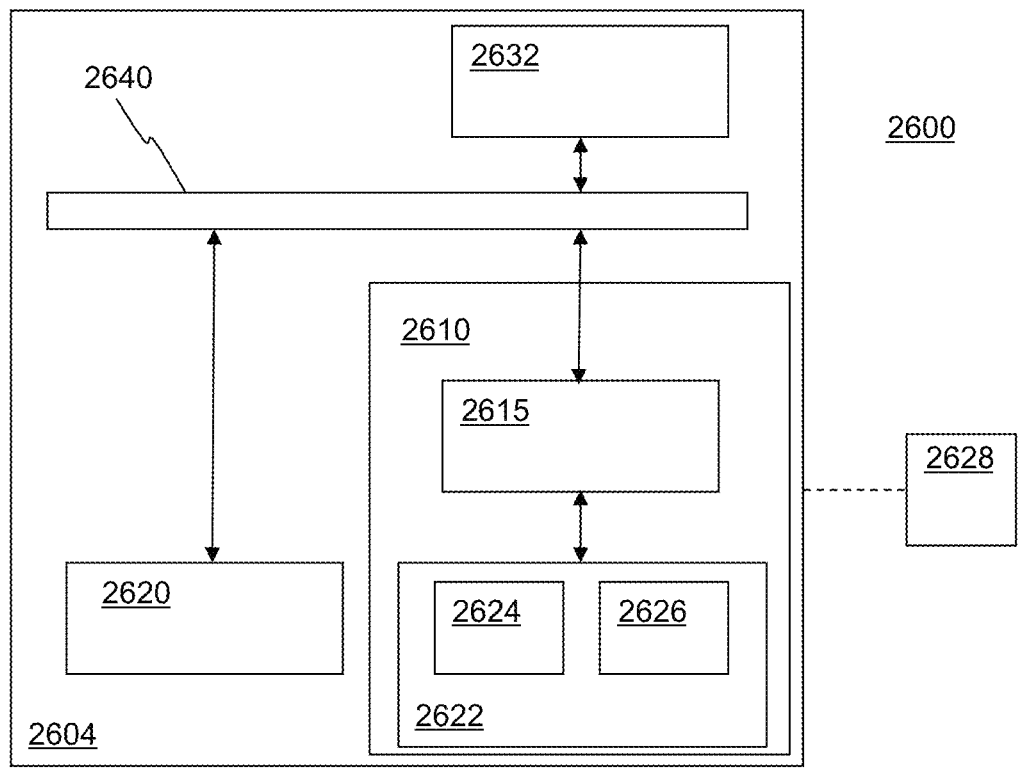
FIG. 26 is a schematic block diagram illustrating a computer system, according to an embodiment.

FIG. 26 is a schematic diagram illustrating an embodiment of a computing system 2600, for example, which may be included in an FAS. Some portions of system 2600 may overlap with some portions of system 2400. System 2600 may be used to perform process 1700, for example. A computing device may comprise one or more processors, for example, to execute an application or other code. A computing device 2604 may be representative of any device, appliance, or machine that may be used to manage memory module 2610. Memory module 2610 may include a memory controller 2615 and a memory 2622. By way of example but not limitation, computing device 2604 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, smartphone, touchpad, or the like; a computing system or associated service provider capability, such as, e.g., a database or information storage service provider or system; or any combination thereof.

It is recognized that all or part of the various devices illustrated in system 2600, and the processes and methods as further described herein, may be implemented using or otherwise including at least one of hardware, firmware, or software, other than software by itself. Thus, by way of example, but not limitation, computing device 2604 may include at least one processing unit 2620 that is operatively coupled to memory 2622 through a bus 2640 and a host or memory controller 2615. Processing unit 2620 is representative of one or more devices capable of performing at least a portion of a computing procedure or process, such as process 2000, for example. By way of example, but not limitation, processing unit 2620 may include one or more processors, microprocessors, controllers, application specific integrated circuits, digital signal processors, programmable logic devices, field programmable gate arrays, and the like, or any combination thereof. Processing unit 2620 may include an operating system to be executed that is capable of communication with memory controller 2615.

In one embodiment, processing unit 2620 may execute code to receive signals from a sound sensor and detect a sound signature of a gunshot from a firearm based, at least in part, on the signals from the sound sensor; receive signals from a 3D sensor, such as an accelerometer, and detect an aim direction of the firearm substantially at the time of detecting the sound signature of the gunshot; set a reference direction based, at least in part, on the aim direction; periodically receive signals from the 3D sensor to detect a current aim direction of the firearm; compare a current aim direction to the reference direction; and initiate an alarm if the current aim direction is beyond a threshold angle of displacement from the reference direction.

An operating system may, for example, generate commands to be sent to memory controller 2615 over or via bus 2640. Commands may comprise read or write commands, for example.

Memory 2622 is representative of any information storage mechanism. Memory may store rules or criteria, signals applied to a subject, output from detectors measuring parameters of a subject, and so on, as explained above. Memory 2622 may include, for example, a primary memory 2624 or a secondary memory 2626. Primary memory 2624 may include, for example, a random access memory, read only memory, etc. While illustrated in this example as being separate from processing unit 2620, it should be understood that all or part of primary memory 2624 may be provided within or otherwise co-located or coupled with processing unit 2620.

Secondary memory 2626 may include, for example, the same or similar type of memory as primary memory or one or more other types of information storage devices or systems, such as a disk drive, an optical disc drive, a tape drive, a solid state memory drive, etc. In certain implementations, secondary memory 2626 may be operatively receptive of, or otherwise capable of being operatively coupled to a computer-readable medium 2628. Computer-readable medium 2628 may include, for example, any medium that is able to store, carry, or make accessible readable, writable, or rewritable information, code, or instructions for one or more of device in system 2600. Computing device 2604 may include, for example, an input/output device or unit 2632.

Input/output unit or device 2632 is representative of one or more devices or features that may be capable of accepting or otherwise receiving signal inputs from a human or a machine, or one or more devices or features that may be capable of delivering or otherwise providing signal outputs to be received by a human or a machine. By way of example but not limitation, input/output device 2632 may include a display, speaker, keyboard, mouse, trackball, touchscreen, etc.

Figure 27:
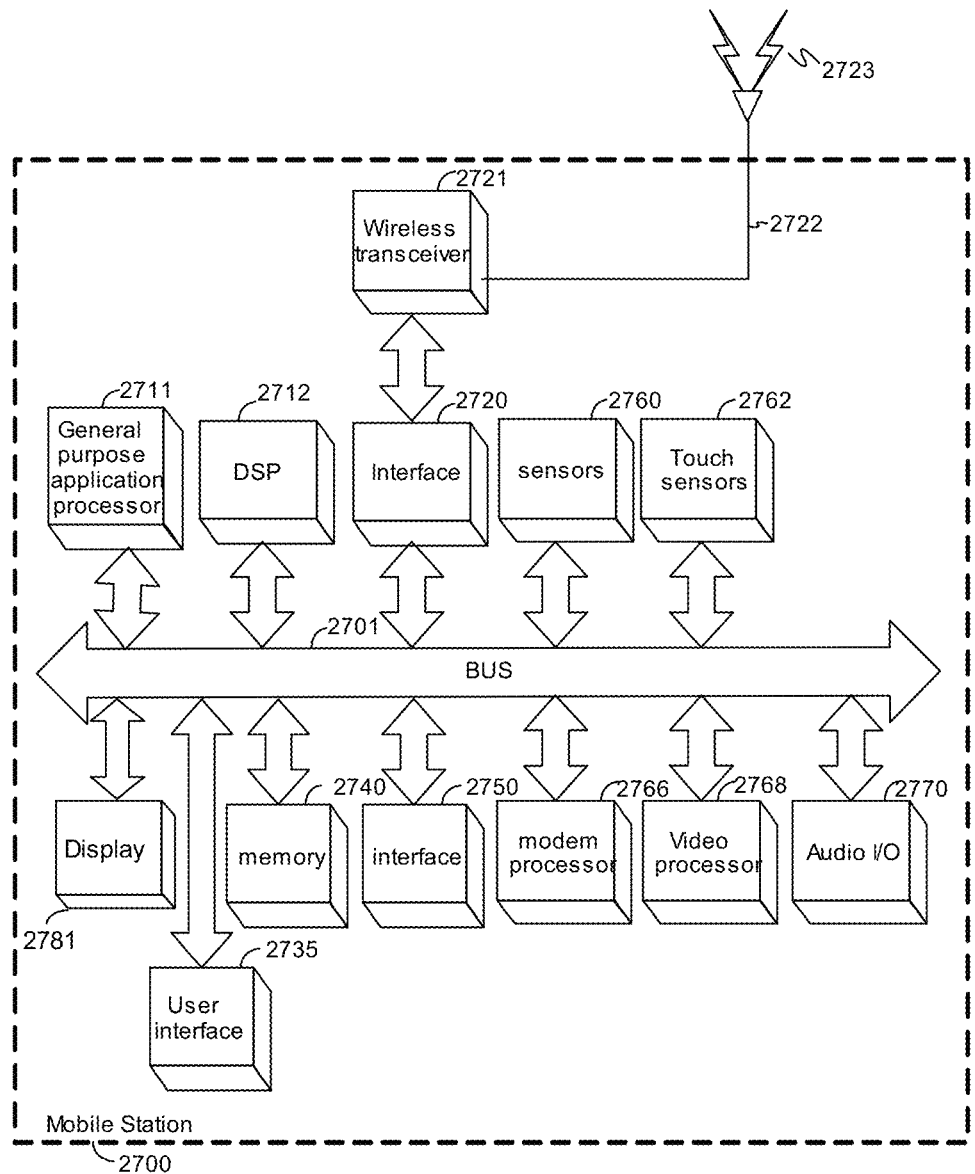
FIG. 27 is a schematic diagram of a portion of an ADSD according to an embodiment.

FIG. 27 is a schematic diagram of a portion of an FAS according to an embodiment. FAS 2700 may comprise one or more features of a system 2400 illustrated in FIG. 24, for example. In certain embodiments, processes such as 1700, for example, may be implemented using elements included in FAS 2700. For example, FAS 2700 may comprise a wireless transceiver 2721 which is capable of transmitting and receiving wireless signals 2723 via an antenna 2722. Wireless transceiver 2721 may be connected to bus 2701 by a wireless transceiver bus interface 2720. Wireless transceiver bus interface 2720 may, in some embodiments be at least partially integrated with wireless transceiver 2721. Some embodiments may include multiple wireless transceivers 2721 and wireless antennas 2722 to enable transmitting and/or receiving signals according to a corresponding multiple wireless communication standards such as, for example, WiFi, CDMA, WCDMA, LTE and Bluetooth, just to name a few examples.

In some embodiments, general-purpose processor(s) 2711, memory 2740, DSP(s) 2712 and/or specialized processors (not illustrated) may also be utilized to process signals acquired via transceivers 2721.

Also illustrated in FIG. 27, FAS 2700 may comprise digital signal processor(s) (DSP(s)) 2712 connected to the bus 2701 by a bus interface 2710, general-purpose processor(s) 2711 connected to the bus 2701 by a bus interface 2710 and memory 2740. Bus interface 2710 may be integrated with the DSP(s) 2712, general-purpose processor(s) 2711 and memory 2740. In various embodiments, functions or processes, such as processes 1700 illustrated in FIG. 17, for example, may be performed in response to execution of one or more machine-readable instructions stored in memory 2740 such as on a computer-readable storage medium, such as RAM, ROM, FLASH, or disc drive, just to name a few example. The one or more instructions may be executable by general-purpose processor(s) 2711, specialized processors, or DSP(s) 2712.

In one implementation, for example, one or more machine-readable instructions stored in memory 2740 may be executable by a processor(s) 2711 to perform processes such as process 1700. In another implementation, for example, one or more machine-readable instructions stored in memory 2740 may be executable by a processor(s) 2711 to: receive signals from a sound sensor and detect a sound signature of a gunshot from a firearm based, at least in part, on the signals from the sound sensor; receive signals from a 3D sensor, such as an accelerometer, and detect an aim direction of the firearm substantially at the time of detecting the sound signature of the gunshot; set a reference direction based, at least in part, on the aim direction; periodically receive signals from the 3D sensor to detect a current aim direction of the firearm; compare a current aim direction to the reference direction; and initiate an alarm if the current aim direction is beyond a threshold angle of displacement from the reference direction.

Memory 2740 may comprise a non-transitory processor-readable memory and/or a computer-readable memory that stores software code (programming code, instructions, etc.) that are executable by processor(s) 2711 and/or DSP(s) 2712 to perform functions described herein.

Also illustrated in FIG. 27, a user interface 2735 may comprise any one of several devices such as, for example, a speaker, microphone, display device, vibration device, keyboard, touch screen, just to name a few examples. In a particular implementation, user interface 2735 may enable a user to interact with one or more applications hosted on FAS 2700. For example, devices of user interface 2735 may store analog or digital signals on memory 2740 to be further processed by DSP(s) 2712 or general purpose processor 2711 in response to action from a user. Similarly, applications hosted on FAS 2700 may store analog or digital signals on memory 2740 to present an output signal to a user. In another implementation, FAS 2700 may optionally include a dedicated audio input/output (I/O) device 2770 comprising, for example, a dedicated speaker, microphone, digital to analog circuitry, analog to digital circuitry, amplifiers and/or gain control. It should be understood, however, that this is merely an example of how an audio I/O may be implemented in an FAS, and that claimed subject matter is not limited in this respect. In another implementation, FAS 2700 may comprise touch sensors 2762 responsive to touching or pressure on a keyboard or touch screen device.

FAS 2700 may also comprise sensors 2760 coupled to bus 2701 which may include, for example, inertial sensors and environment sensors that may be used to detect sounds, firearm orientations, and so on, as described above. Inertial sensors of sensors 2760 may comprise, for example accelerometers (e.g., collectively responding to acceleration of a firearm in three dimensions), one or more gyroscopes, or one or more magnetometers (e.g., to support one or more compass applications). Environment sensors of FAS 2700 may comprise, for example, temperature sensors, capacitive touch sensors, ambient light sensors, camera imagers, and microphones, just to name few examples. Sensors 2760 may generate analog or digital signals that may be stored in memory 2740 and processed by DPS(s) or general purpose processor 2711 in support of one or more applications such as, for example, applications directed to positioning or navigation operations.

In a particular implementation, FAS 2700 may comprise a dedicated modem processor 2766 capable of performing baseband processing of signals received and downconverted at wireless transceiver 2721 or SPS receiver 2755. Similarly, modem processor 2766 may perform baseband processing of signals to be upconverted for transmission by wireless transceiver 2721. In alternative implementations, instead of having a dedicated modem processor, baseband processing may be performed by a general purpose processor or DSP (e.g., general purpose/application processor 2711 or DSP(s) 2712). It should be understood, however, that these are merely examples of structures that may perform baseband processing, and that claimed subject matter is not limited in this respect.

Figure 28:
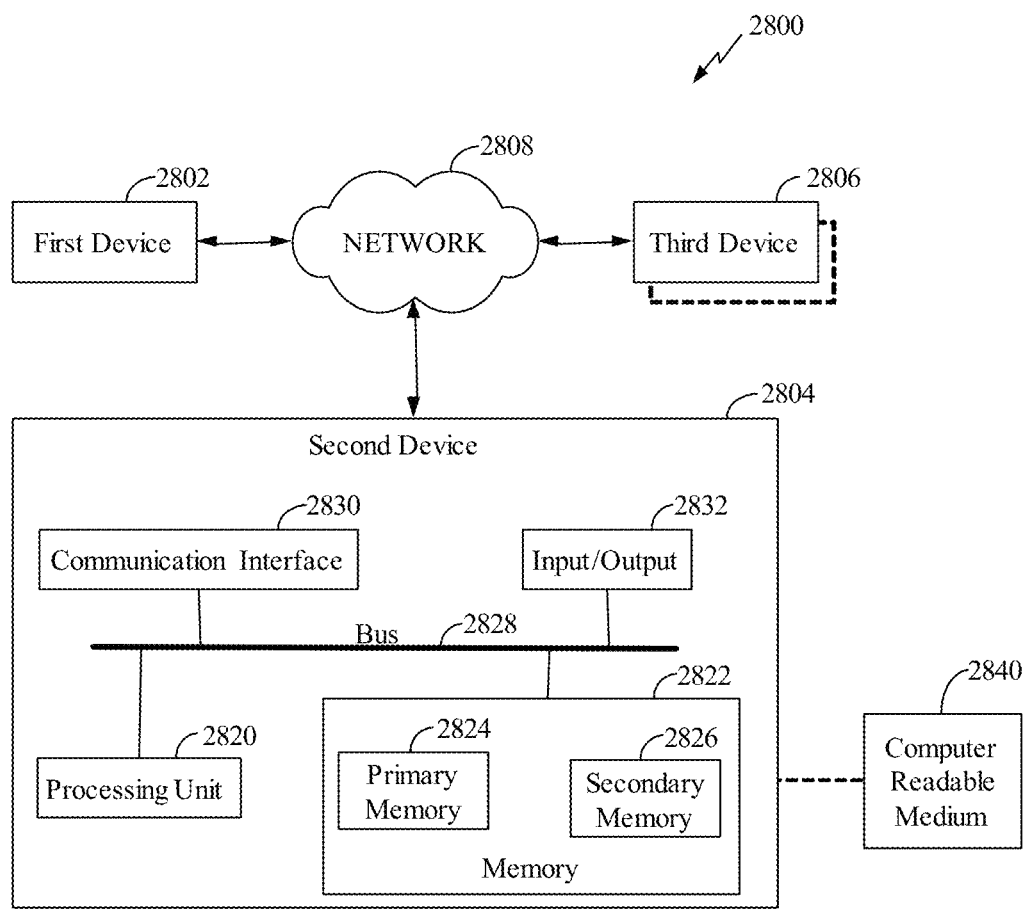
FIG. 28 is a schematic diagram illustrating an example system that may include one or more devices configurable to implement techniques or processes.

FIG. 28 is a schematic diagram illustrating an example system 2800 that may include one or more devices configurable to implement techniques or processes, such as process 1700 described above, for example, in connection with FIG. 17. System 2800 may include, for example, a first device 2802, a second device 2804, and a third device 2806, which may be operatively coupled together through a wireless communications network 2808. Such devices may comprise an FAS, a touch sensor, an actuator, a 3D sensor, and so on.

First device 2802, second device 2804 and third device 2806, as illustrated in FIG. 28, may be representative of any device, appliance or machine that may be configurable to exchange data over wireless communications network 2808, which may comprise empty space (e.g., hardware need not be included). By way of example but not limitation, any of first device 2802, second device 2804, or third device 2806 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; one or more sensors, actuators, detectors; or any combination thereof.

Similarly, wireless communications network 2808, as illustrated in FIG. 28, is representative of one or more communication links, processes, or resources configurable to support the exchange of data between at least two of first device 2802, second device 2804, and third device 2806. By way of example but not limitation, wireless communications network 2808 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 2806, there may be additional like devices operatively coupled to wireless communications network 2808.

It is recognized that all or part of the various devices and networks illustrated in system 2800, and the processes and methods as further described herein, may be implemented using or otherwise including hardware, firmware, software, or any combination thereof.

Thus, by way of example but not limitation, second device 2804 may include at least one processing unit 2820 that is operatively coupled to a memory 2822 through a bus 2828. In one implementation, for example, one or more machine-readable instructions stored in memory 2822 may be executable by processing unit 2820 to: receive signals from a sound sensor and detect a sound signature of a gunshot from a firearm based, at least in part, on the signals from the sound sensor; receive signals from a 3D sensor, such as an accelerometer, and detect an aim direction of the firearm substantially at the time of detecting the sound signature of the gunshot; set a reference direction based, at least in part, on the aim direction; periodically receive signals from the 3D sensor to detect a current aim direction of the firearm; compare a current aim direction to the reference direction; and initiate an alarm if the current aim direction is beyond a threshold angle of displacement from the reference direction.

Processing unit 2820 is representative of one or more circuits configurable to perform at least a portion of a data computing procedure or process. By way of example but not limitation, processing unit 2820 may include one or more processors, controllers, microprocessors, microcontrollers, application specific integrated circuits, digital signal processors, programmable logic devices, field programmable gate arrays, and the like, or any combination thereof. In certain embodiments, processes such 1700, for example, may be performed by processing unit 2820. In other embodiments, input/output 2832 may provide a means for obtaining measurements of one or more sensors located on a firearm via wireless signals by an FAS while located in a signal environment.

Memory 2822 is representative of any data storage mechanism. Memory 2822 may include, for example, a primary memory 2824 or a secondary memory 2826. Primary memory 2824 may include, for example, a random access memory, read only memory, etc. While illustrated in this example as being separate from processing unit 2820, it should be understood that all or part of primary memory 2824 may be provided within or otherwise co-located/coupled with processing unit 2820.

Secondary memory 2826 may include, for example, the same or similar type of memory as primary memory or one or more data storage devices or systems, such as, for example, a disk drive, an optical disc drive, a tape drive, a solid state memory drive, etc. In certain implementations, secondary memory 2826 may be operatively receptive of, or otherwise configurable to couple to, a computer-readable medium 2840. Computer-readable medium 2840 may include, for example, any non-transitory medium that can carry or make accessible data, code or instructions for one or more of the devices in system 2800. Computer-readable medium 2840 may also be referred to as a storage medium.

Second device 2804 may include, for example, a communication interface 2830 that provides for or otherwise supports the operative coupling of second device 2804 to at least wireless communications network 2808. By way of example but not limitation, communication interface 2830 may include a network interface device or card, a modem, a router, a switch, a transceiver, and the like.

Second device 2804 may include, for example, an input/output device 2832. Input/output device 2832 is representative of one or more devices or features that may be configurable to accept or otherwise introduce human or machine inputs, or one or more devices or features that may be configurable to deliver or otherwise provide for human or machine outputs. By way of example but not limitation, input/output device 2832 may include an operatively configured display, speaker, keyboard, mouse, trackball, touch screen, data port, etc.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femto cell, utilized to extend cellular telephone service into a business or home. In such an implementation, one or more FASs may communicate with a femto cell via a code division multiple access ("CDMA") cellular communication protocol, for example, and the femto cell may provide the FAS access to a larger cellular telecommunication network by way of another broadband network such as the Internet.

In some embodiments, an FAS may perform a number of operations to measure various parameters associated with recoil or kickback of a firearm. The aim direction of the firearm at the time of the gunshot may be used as a reference direction, which is the direction at which the firearm was aimed for the gunshot. A 3D sensor may sense or detect subsequent aim directions of the firearm. For example, aim directions of the firearm may be sensed from time to time or at some frequency. For particular examples, aim directions may be sensed at a frequency of every tenth of a second, every hundredth of a second, or greater. A frequency may be used so that recoil (or kickback) motion of a firearm may be resolved. (Herein, recoil and kickback are used interchangeably unless otherwise specified.) In some implementations, it may be desirable to determine a maximum angle, as measured from the reference direction, that the firearm rotates during recoil. Accordingly, a frequency of detecting aim directions of the firearm may be high enough so that a maximum angle may be determined (e.g., as opposed to a relatively low frequency that provides relatively coarse aim direction measurements). Recoil measurements may include, among other things, such a maximum angle of rotation.

Angles of recoil may be measured in a plane that is parallel to the firearm. For example, a firearm may be considered to be in a plane that includes the trigger, trigger guard, grip, sights, and/or aim direction. Such a plane is hereinafter called a firearm plane. The firearm plane may be imagined as a "slice" that runs through the centers of the sites, trigger, trigger guard, and grip. Recoil motion may include rotation of the firearm at an angle that comprises a component in the firearm plane and a component perpendicular to the firearm plane, hereinafter called the lateral plane. Recoil measurements may include maximum recoil angle in the firearm plane and/or the lateral plane. Such measurements may be useful for determining, among other things, quality of hold or grip that a shooter has on the firearm. Such measurements may also be useful for determining characteristics of the firearm and/or ammunition being fired. Such characteristics may include, among other things, firing power of the firearm-ammunition combination, structure of the firearm (e.g., position or size of the grip with respect to the barrel axis), and so on. In some implementations, such measurements may be useful for determining or selecting a firearm for a particular user. For example, a firearm that tends to produce large recoil angles may be better-suited for a strong or large person, having shooting experience. Such a firearm may be undesirable for a small or inexperienced shooter.

In some embodiments, recoil measurements may include maximum recoil angles for each of multiple gunshots. For example, a shooter may fire a gun several times in a period of less than a few seconds. Recoil measurements may include maximum recoil of all shots fired or maximum recoil of each shot fired, for example.

In an example embodiment involving multiple gunshots (e.g., a group of shots), a technique for measuring recoil may include detecting multiple gunshots of the firearm; sensing aim directions of the firearm substantially at the times of each of the gunshots (e.g., the time when a gunshot is detected is at least approximately the same as when the gunshot occurs); sensing aim directions of the firearm after each of the times subsequent to the gunshots (e.g., aim direction of the firearm may be measured continuously, from time to time, or at a frequency, such as a frequency sufficient to resolve maximum recoil angle for each of the gunshots); comparing the aim directions to the aim direction of the first gunshot (e.g., used as a global aim-direction reference for all the subsequent shots in the group) or each of the gunshots (e.g., wherein each gunshot of the group has its own aim-direction reference); and generating one or more recoil measurements based, at least in part, on the comparing.

In various embodiments, one or more recoil measurements may be displayed in a display device. In some implementations, an FAS may be solely located on a firearm. In such a case, the FAS may include a display device located on the firearm. In other implementations, a portion of an FAS may be located on a firearm and other portion(s) of the FAS may be located remotely from the firearm. Communications between or among the portions may be wireless, for example. In such a case, the FAS may include a display device located remotely from the firearm, such as in a mobile computing device.

In some embodiments, an FAS may record a history of one or more recoil measurements. For example, recoil measurements, or data associated with or representative of recoil measurements, may be stored in a memory, which may be located in a portion of the FAS on the firearm or in a portion of the FAS that is remote from the firearm. History may span several seconds, minutes, hours, days, or years.

For example, relatively short histories (e.g., a few seconds) may reveal recoil motions that include recoil angles as a function of time (which may be plotted in a displayed graph). Graphs or plots of such motions may be beneficial in that shapes of curves in the plots may indicate various parameters of dynamics of the recoil motion, as described below.

Figure 29:
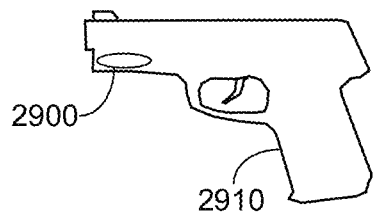
FIG. 29 is a schematic side view of a firearm, according to embodiments.
Figure 30:
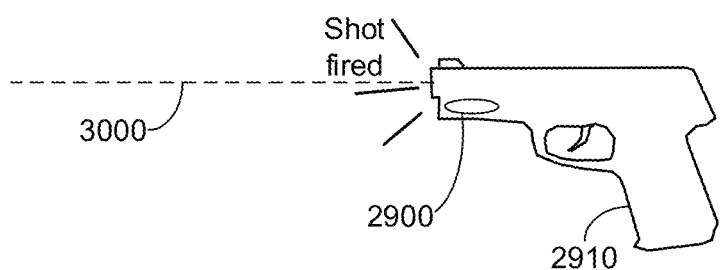
FIGS. 30-32 are schematic side views of a firearm firing a gunshot that results in recoil, according to embodiments.
Figure 31:
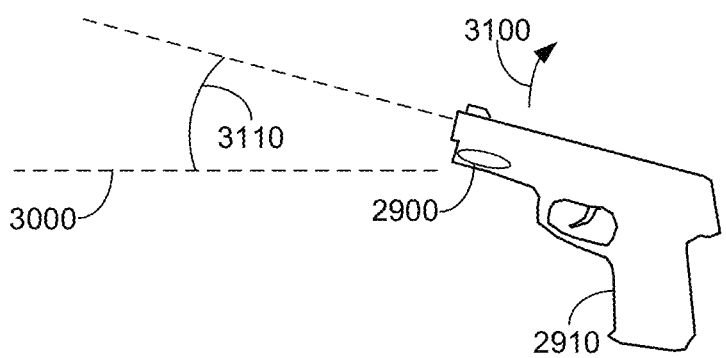

FIGS. 29-32 are schematic side views of a firearm 2910. FIG. 31 is a schematic side view of firearm 2910 firing a gunshot that results in recoil, according to embodiments. The firearm plane is in the page of the figures. An FAS 2900, or a portion thereof, may be located on any portion of firearm 2910. In FIG. 29, a shooter (not illustrated) may grip firearm 2910 and prepare to shoot the firearm. The firearm need not be fired at any particular target in any particular direction. In some implementations, FAS 2900 may measure aim directions before a shot is fired from firearm 2910. Such measured aim directions may be stored in a memory. For example, aim directions may be measured every tenth of a second before a shot is fired. (A measurement frequency may change subsequent to a shot being fired.) FAS 2900 may include a memory to store aim direction data in a first-in-first-out (FIFO) scheme, for example, so that older data is purged to allow new data to be stored.

In FIG. 30, a shot is fired from firearm 2910. At this time, FAS 2900 may detect or measure the aim direction of firearm 2910. The aim direction at the time of the gunshot is the reference aim direction 3000 to which subsequent aim directions are to be compared. Accordingly, the reference aim direction may be stored in memory.

Figure 32:
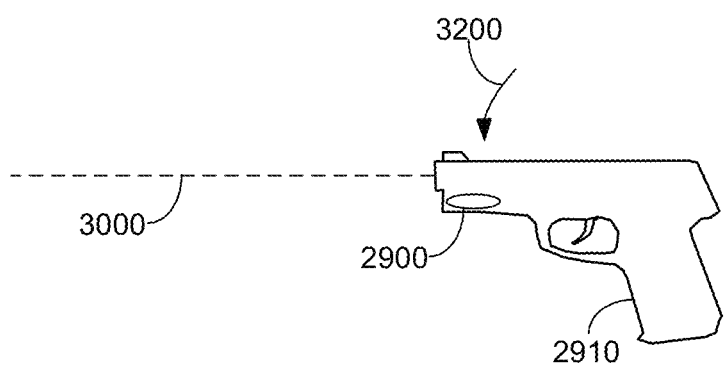

In FIG. 31, a fraction of a second after the gunshot, for example, firearm 2910 experiences recoil and the firearm tends to rotate, as indicated by arrow 3100. Dynamics of such rotation may depend, at least in part, on the shooter's grip on firearm 2910, shooting power of the firearm-ammunition combination, and moment arm of the barrel with respect to the grip, just to name a few examples. FAS 2900 may measure aim directions of firearm 2910 with a frequency high enough to detect a maximum angle of recoil. For example, angle 3110 may be the maximum angle (relative to reference aim direction 3000) that firearm 2910 recoils before the shooter's grip overpowers the recoil to return the firearm to an aim direction at or near the aim direction of the gunshot (e.g., the reference aim direction—although a shooter's skill will determine, at least in part, how close the shooter can return the aim direction to the reference aim direction. In some cases, such as in the case of a moving target, the shooter would not want to return the firearm to the original shooting direction). FIG. 32 shows firearm 2910 returned to (or at least near) the reference aim direction 3000 illustrated in FIG. 30. Arrow 3200 indicates rotation of firearm 2910 as the firearm is returned to a shooting position by the shooter, for example.

Recoil tends to rotate a firearm in the firearm plane. At least one reason for this is because the barrel where the ammunition is discharged is along an axis that is offset from the grip of the firearm. For example, such recoil rotation need not occur if grip was directly behind the location of discharge, along the axis of the barrel.

Shooters wishing to improve their shooting and firearm-handling skills may consider details about their grip of a firearm. The amount of recoil rotation 3100 and/or a maximum recoil angle 3110 may depend, at least in part, on the shooter's grip. Well-placed hands on the grip of the firearm, for example, may lead to relatively small maximum recoil angle, whereas poor grip may lead to relatively large maximum recoil angle. Grip may involve positioning of the palms and fingers of one or both hands with respect to the firearm, and the direction and magnitude of forces applied by the palms and fingers of one or both hands on the firearm, for example. Generally, an experienced and skilled shooter may avoid relatively large recoil angles. However, such an experienced shooter able to apply a good grip may experience large recoil angles when shooting a relatively large caliber firearm (e.g., .40 or .50 calibers) if the shooter is more familiar with small caliber firearms (e.g., 9 mm), for example.

A measurement of maximum recoil angle may be a useful metric for a shooter to determine the quality of their grip on the firearm. A controlled and effective grip against recoil may be challenging. One reason is that a shooter initiates and settles into a grip before the gunshot and the resulting recoil. In other words, the grip to resist recoil is established before the recoil occurs. Accordingly, the grip must anticipate forces of recoil. A measurement of maximum recoil angle may be useful while a shooter practices shooting and grip. For example, a shooter may adjust grip for subsequent gunshots in attempt to reduce maximum recoil angle.

Figure 33:
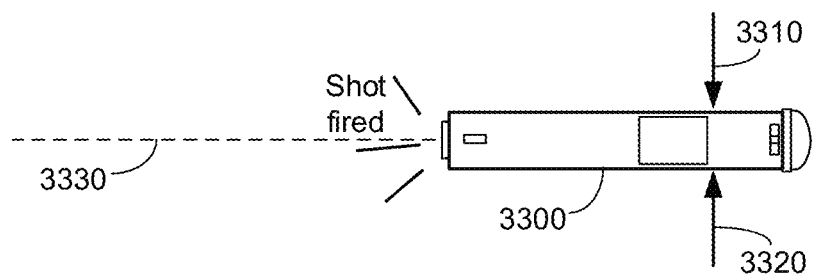
FIGS. 33-36 are schematic top views of a firearm firing a gunshot that results in recoil, according to embodiments.
Figure 34:
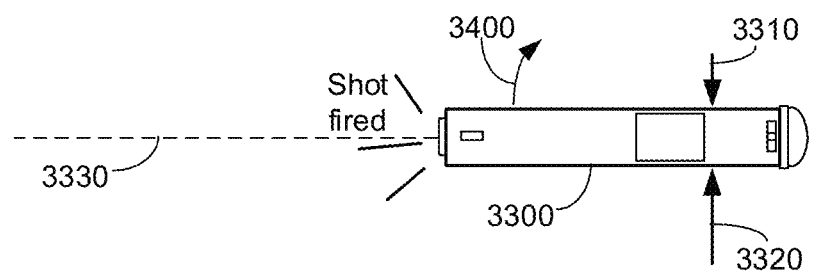
Figure 35:
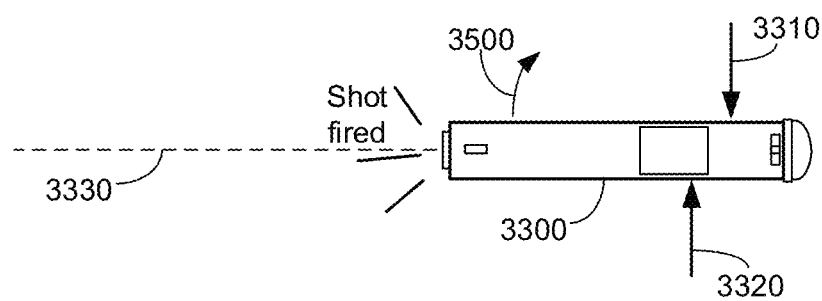

FIGS. 33-35 are schematic top views of a firearm 3300 firing a gunshot that leads to recoil, according to embodiments. The lateral plane is in the page of the figures. Arrows 3310 and 3320 represent a shooters grip of firearm 3300. In FIG. 33, where length of the arrows schematically indicates strength of grip applied to the firearm in the directions of the arrows, the grip strength is equal. This may mean, for example, that a shooter is gripping the firearm with substantially equal strength applied by the right hand and the left hand. In such a case, recoil in the lateral plane may be relatively small or zero. Recoil may be measured as an angle with respect to a reference aim direction 3330, which may be the aim direction of firearm 3300 at the time of the gunshot.

In FIG. 34, length of the arrows schematically indicates that strength of grip applied to firearm 3300 is not equal. This may mean, for example, that a shooter is gripping the firearm with greater strength applied by one hand as compared to the other hand. In the particular example illustrated in FIG. 34, the shooter's right hand is applying less resistive force against recoil of a gunshot as compared to the left hand. In such a case, recoil in the lateral plane may rotate the firearm toward the right, as indicated by arrow 3400.

In FIG. 35, length of the arrows schematically indicates that strength of grip applied to the firearm may be substantially equal, but the grips on the two opposing directions are offset from each other. This may mean, for example, that a shooter is effectively gripping the firearm with one hand forward of the other hand. In the particular example illustrated in FIG. 35, the shooter's left hand is applying a resistive force against recoil of a gunshot forward of the right hand. In such a case, recoil in the lateral plane may rotate the firearm toward the right, as indicated by arrow 3500.

Figure 36:
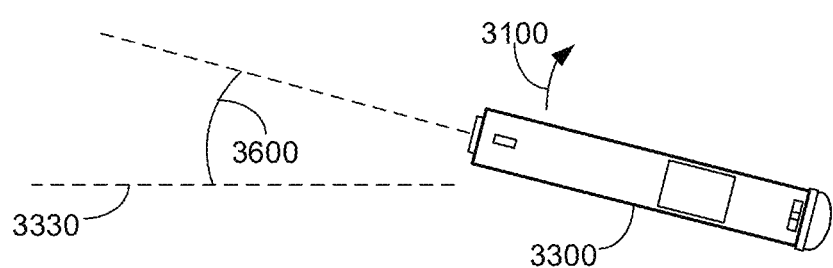

FIG. 36 shows a lateral recoil angle 3600 measured with respect to reference aim direction 3330, for example. A measurement of maximum lateral recoil angle may be a useful metric for a shooter to determine the quality of their grip on the firearm. A grip that applies substantially equal resistive force from the right and from the left against lateral recoil may be challenging. One reason is that a shooter initiates and settles into a grip before the gunshot and recoil. In other words, the grip to resist recoil is established before the recoil occurs. Accordingly, the grip must anticipate forces of recoil. For grips that involve both left and right hands, the balance between the hands may be challenging. A measurement of value of maximum lateral recoil angle may be useful while a shooter practices shooting and grip. For example, a shooter may adjust grip in attempt to reduce maximum lateral recoil angle.

Figure 37:
FIG. 37 is a time line of a process of measuring recoil of a firearm, according to embodiments.

FIG. 37 is a time line of a process for measuring recoil of a firearm, according to embodiments. For example, such a process may be performed by an FAS (e.g., an RMS). Distances between ticks on the timeline are not based on any scale and are spaced apart by amounts that merely roughly indicate relative time intervals for a particular example. At time T1, an FAS may be switched to an operating mode (e.g., turned on). (In some implementations, an FAS may automatically turn on upon or after detecting a gunshot.) From T1, in some implementations, the FAS may begin to measure aim direction of the firearm. At time T2, a gunshot is fired from the firearm. At time T3, the gunshot is detected. A time span between time T2 and time T3 may be relatively short, such as a few microseconds or a few milliseconds depending, at least in part, on the design and characteristics of the FAS. At time T4, the aim direction of the firearm is detected or measured and this aim direction may be considered to be the reference aim direction. A time span between time T3 and time T4 may be relatively short, such as a few microseconds or a few milliseconds depending, at least in part, on the design and characteristics of the FAS. Design considerations of the FAS may involve the types of detectors used for detecting or sensing a gunshot and aim directions, for example. In some implementations, the aim direction of the firearm may be detected or measured before the gunshot is detected (e.g., before time T2). For example, aim directions may be measured prior to the gunshot. In this case, the latest aim direction measurement just prior to the gunshot may be considered to be the aim direction to be used as a reference aim direction.

From time T5 to time T7, the aim direction of the firearm is detected or sensed repeatedly at short time intervals as the firearm rotates due to recoil. A frequency of detection may be high enough to detect a rotation turning point where the firearm reverses rotation direction. Rotation turning point may occur when a shooter's grip on the firearm overcomes the recoil dynamics resulting from the gunshot. The turning point occurs at the maximum recoil angle, at time T6. The FAS may discontinue detecting aim direction subsequent to determining that a rotation turning point occurred. At time T8, the FAS may display and/or record the value of the maximum recoil angle.

Figure 38:
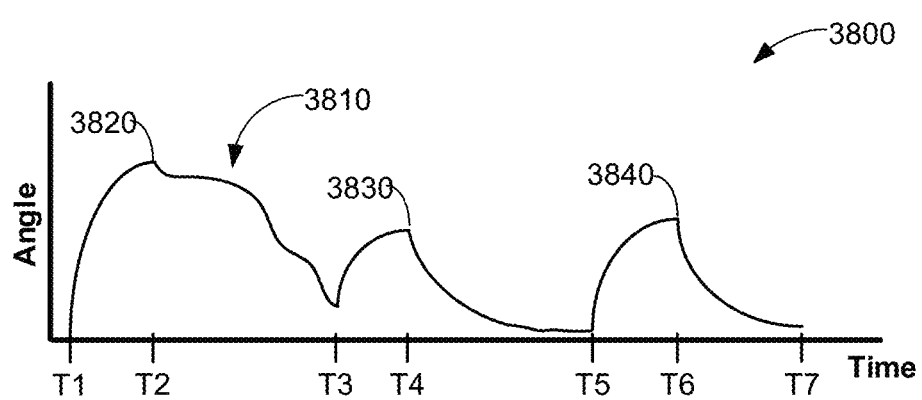
FIG. 38 is a plot of angle of a firearm as a function of time, according to embodiments.

FIG. 38 is a plot 3800 of recoil angle of a firearm as a function of time, according to embodiments. In particular, the recoil angle is with respect to a reference aim direction, which is the direction of aim at the time the firearm fired a gunshot that produced the recoil. Vertical and horizontal scale in plot 3800 is relative. Plot 3800 includes a recoil angle curve 3810 that describes three gunshots. In some embodiments, data representative of such a plot may be stored and/or such a plot may be displayed on a display device as an analytic tool for a shooter or instructor of a shooter, for example. An FAS may be used to perform a process that leads to plot 3800, for example.

At time T1 (T1, T2, T3 . . . of FIG. 37 are independent of T1, T2, T3 . . . in FIG. 38) a gunshot is fired by the firearm and the recoil angle starts at zero so as to define the reference aim direction. From time T1 to time T2, the recoil angle of the firearm rapidly increases as the firearm rotates from the recoil of the gunshot. During this time span, however, the rate of increase of recoil angle decreases (e.g., slope of curve 3810 decreases) as the shooter, via the grip on the firearm, begins to control and overcome the rotation form the recoil.

At time T2, the rotation reaches a turning point 3820 where a maximum recoil angle occurs. The maximum recoil angle may be stored in memory and/or displayed by a display device. The maximum recoil angle may be with respect to the zero angle of the reference aim direction established by the first gunshot at time T1, for example.

Between times T2 and T3, the shooter rotates the firearm back toward the initial aim direction as the shooter continues, at least in part, to counter the recoil motion. At time T3, the shooter fires another gunshot. In this particular example, the second gunshot occurs before the firearm is aimed in the same direction of the first gunshot (e.g., curve 3810 does not drop to zero at time T3).

From time T3 to time T4, the recoil angle rapidly increases as the firearm rotates from the recoil of the second gunshot. During this time span, however, the rate of increase of recoil angle decreases (e.g., slope of curve 3810 decreases) as the shooter, via the grip on the firearm, begins to control and overcome the rotation form the recoil. At time T4, the rotation reaches a turning point 3830 where a maximum recoil angle occurs. The maximum recoil angle may be stored in memory and/or displayed by a display device. The maximum recoil angle for the second gunshot may be with respect to the zero angle of the reference aim direction established by the first shot at time T1, for example. However, in another implementation, the maximum recoil angle may be with respect to the angle of a new reference aim direction established by the second shot at time T3.

In this example, the shooter appears to have a better (e.g., more controlled) grip on the firearm as compared to the grip for the first shot, because the turning point 3830 (maximum recoil angle) occurs at a smaller recoil angle as compared to the maximum recoil angle of the first gunshot. Another reason for the smaller maximum recoil may be that the shooter is more familiar with the recoil behavior of the firearm for the second gunshot due to their experience with the recoil of the first gunshot.

Between times T4 and T5, the shooter rotates the firearm back toward the initial aim direction. At time T5, the shooter fires another gunshot. In this particular example, the third gunshot occurs before the firearm is aimed in the same direction of the first gunshot (e.g., curve 3820 does not drop to zero at time T5), but aim of the third gunshot is closer to the aim of the first gunshot compared to the aim of the second gunshot.

From time T5 to time T6, the recoil angle rapidly increases as the firearm rotates from the recoil of the third gunshot. During this time span, however, the rate of increase of recoil angle decreases (e.g., slope of curve 3810 decreases) as the shooter, via the grip on the firearm, begins to control and overcome the rotation form the recoil. At time T6, the rotation reaches a turning point 3840 where a maximum recoil angle occurs. The value of the maximum recoil angle may be stored in memory and/or displayed by a display device. The value of the maximum recoil angle for the third gunshot may be with respect to the zero angle of the reference aim direction established by the first shot at time T1, for example. However, in another implementation, the value of the maximum recoil angle may be with respect to the angle of a new reference aim direction established by the third shot at time T5. For example, determining what reference angle to use may be an option selectable by a user of the FAS.

In some embodiments, the three gunshots depicted in plot 3800 may be a group of gunshots that occur over a relatively short time span (e.g., less than a few seconds). In such a case, it may be beneficial for a FAS to display or record the largest of the three maximum recoil angles, relative to the aim direction at the first gunshot (e.g., time T1).

In some embodiments average maximum recoil angle over multiple gunshots may be determined, recorded (stored), and/or displayed. For example, maximum recoil angles for each of the three shots in the above example embodiment may be averaged. In some implementations, maximum recoil angles for each of the gunshots may be with respect to a reference aim direction for each of the gunshots. In other implementations, maximum recoil angles for each of the gunshots may be with respect to the reference aim direction of the first gunshot.

In some embodiments maximum recoil angle over multiple gunshots may be determined, recorded (stored), and/or displayed. For example, a global maximum value (e.g., a single maximum value) of the maximum recoil angles for each of the three gunshots in the above example embodiment may be determined, recorded (stored), and/or displayed.

In some embodiments, after firing a group of gunshots (e.g., the three gunshots in the above example), a user of the FAS may manually reset the FAS for a subsequent gunshot or group of gunshots. In this way, determinations of averages or maxima of recoils need not consider history of gunshots and recoil that occurred prior to the current group of gunshots.

Figure 39:
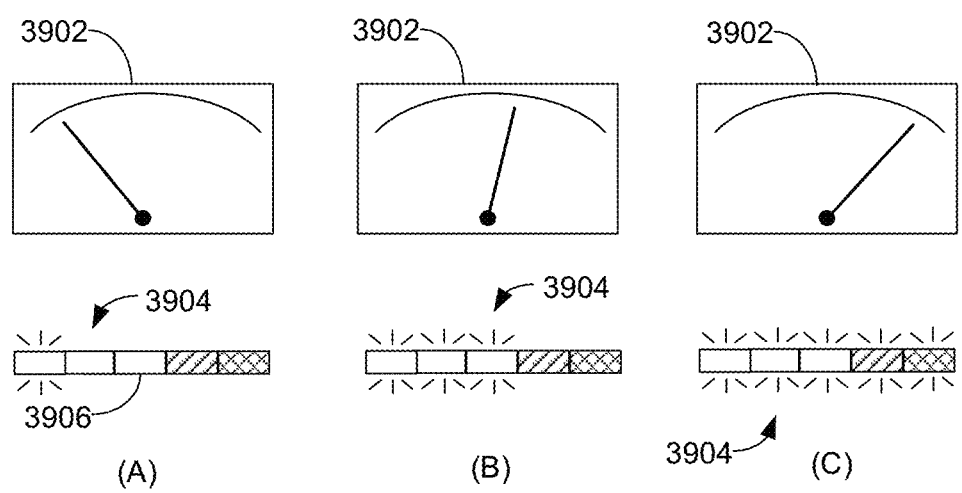
FIG. 39 includes schematic illustrations of various meters for indicating recoil measurements for a firearm, according to embodiments.

FIG. 39 includes schematic illustrations of various example meters for indicating recoil measurements for a firearm, according to embodiments. For example, recoil angle may be displayed in a digital display or as a display on a display device. Recoil angle, average recoil angle, and/or maximum recoil angle may be displayed by any of a number of techniques. Such recoil information may be displayed by an FAS on a display that is on a firearm or remote from the firearm. Such recoil information may be stored by an FAS in a memory that is on the firearm or remote from the firearm.

In FIG. 39, the top row of meters includes analog meters that are used for the following description of a LED bar indicators. For example, meters or indicators that indicate amount(s) of recoil, such as maximum recoil angle, may be in a location visible to a user (e.g., shooter) of the firearm or another person (e.g., a shooting instructor or observer) in the vicinity. In one implementation, such a meter or indicator may be visible in a scope (e.g., scope 510). In part (A) of FIG. 39, a relatively low value (as indicated by meter 3902) for recoil angle (e.g., maximum or average recoil angle over a group of gunshots) is displayed by LED bar meter 3904. Accordingly, only one of five LEDs 3906 may be lit. In part (B) of FIG. 39, a medium value (as indicated by meter 3902) for recoil angle (e.g., maximum or average recoil over a group of gunshots) is displayed by LED bar meter 3904. Accordingly, three of five LEDs 3906 are lit. In part (C) of FIG. 39, a relatively high value (as indicated by meter 3902) for recoil angle (e.g., maximum or average recoil over a group of gunshots) is displayed by LED bar meter 3904. Accordingly, all five LEDs 3906 are lit. The LEDs that indicate relative high values of recoil when lit may be different colors than the other LEDs, for example.

In some embodiments, an FAS (e.g., an SSS) may perform a process that indicates which bullet strike marks on a target correspond to which gunshots in a sequence of gunshots discharged by a firearm. Such a process may include generating a display to be displayed on a display device, where the display includes bullet strike location information and/or corresponding shot sequence order for each of the bullet strikes. Locations of the bullet strike icons in a display image may be based, at least in part, on measured aim directions of each of the gunshots. In some implementations, the display image may include sequence numbers associated with the bullet strike icons, wherein the sequence numbers are based, at least in part, on the recorded times and/or sequence order of the gunshots.

In some embodiments, motion of the firearm may be measured, such as by a 3D sensor (or more than one 3D sensor), substantially at the times of detecting each of the gunshots. In such a case, the rendered display image may include display elements indicative of and based, at least in part, on the measured motion of the firearm at the times of detecting each of the gunshots. For example, the measured motion may include respective speeds of translation and/or rotation (e.g., due to recoil and/or kickback) of the firearm at the times of detecting each of the gunshots. In some implementations, the display elements may comprise ellipses having radii based, at least in part, on the respective speeds of translation and/or rotation of the firearm at the times of detecting the respective gunshots.

In some embodiments, an FAS, at least a portion of which may be located remotely from the firearm, may perform a process that includes receiving data representative of respective aim directions of the firearm measured substantially at times of the gunshots; recording sequence order and/or time of the respective gunshots; and generating output for displaying an image that includes respective bullet strike icons that represent bullet strikes on a target, wherein locations of the bullet strike icons in the display image are based, at least in part, on the measured aim directions of the respective gunshots.

Figure 40:
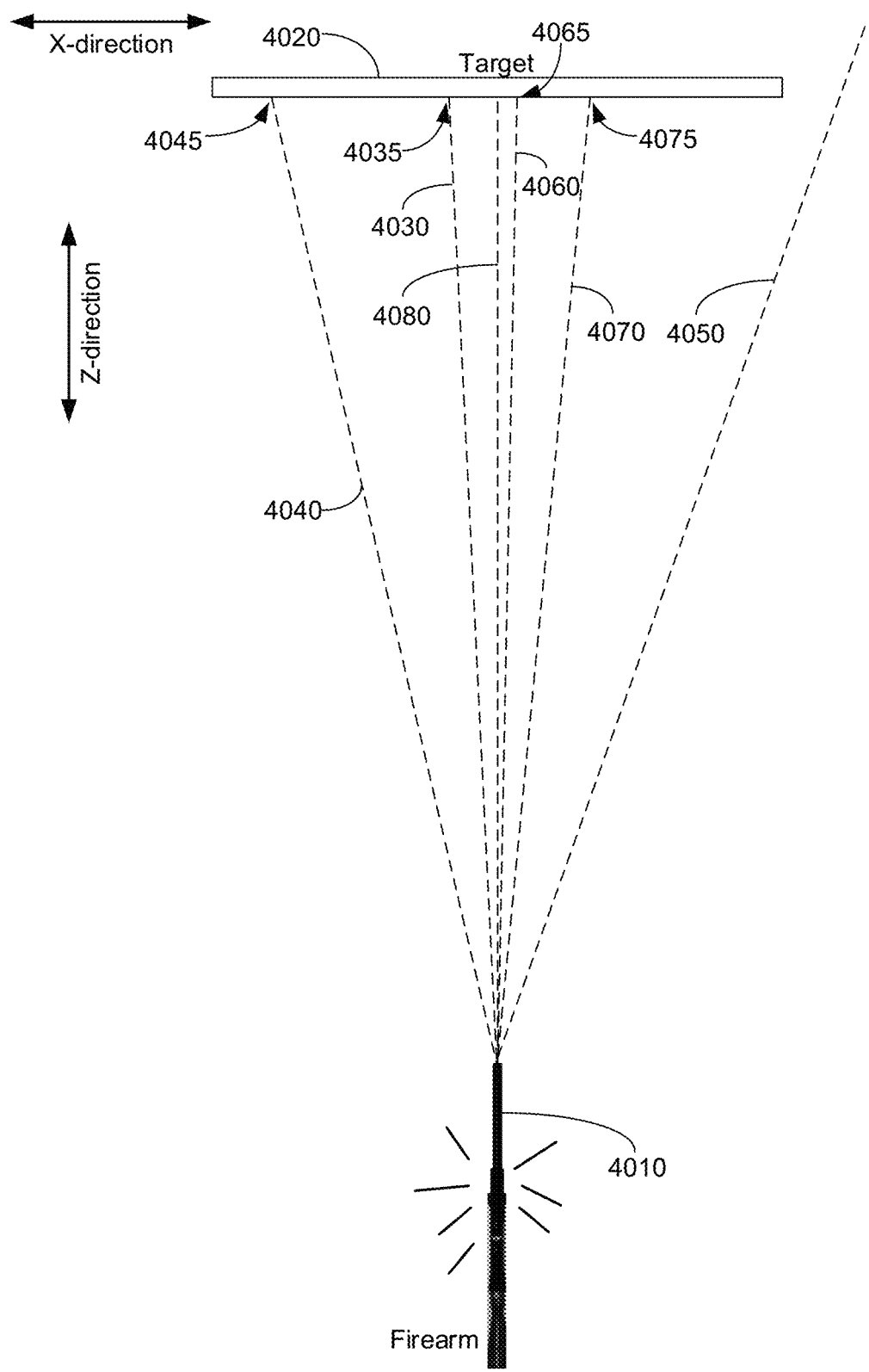
FIG. 40 is a schematic top view of a firearm and a target, according to some embodiments.

FIG. 40 is a schematic top view of a firearm 4010 and a target 4020, according to some embodiments. As depicted in the figure, a number of gunshots are fired from firearm 4010 toward target 4020. For reference, the X-direction is illustrated. A Y-direction is in and out of the page of the figure. Thus, target 4020 is in the X-Y plane. A Z-direction is perpendicular to the X-Y plane. Aim directions (e.g., components thereof in the X-Z plane) of firearm 4010 for the respective gunshots are illustrated as dashed lines. The figure includes indications of horizontal positions of the bullet strikes (in this top view) of several of the gunshots on target 4020. For example, aim direction 4030 results in a bullet strike 4035 on target 4020, aim direction 4040 results in a bullet strike 4045 on the target, aim direction 4060 results in a bullet strike 4065 on the target, and aim direction 4070 results in a bullet strike 4075 on the target. Aim direction 4050 corresponds to a gunshot that missed the target, for example. Dashed line 4080 is a reference direction to the center of the target. In this particular example, aim direction 4030 corresponds to the first gunshot, aim direction 4040 corresponds to the second gunshot, aim direction 4050 corresponds to the third gunshot, aim direction 4060 corresponds to the fourth gunshot, and aim direction 4070 corresponds to the fifth gunshot.

The FAS may determine aim directions for each of the gunshots by detecting sound and/or recoil of the firearm as it discharges live ammunition, for example. In some implementations, a microphone and/or 3D sensor of the FAS may detect such effects of a gunshot. Note that the gunshot corresponding to aim direction 4050 missed the target, while the gunshot corresponding to aim direction 4060 came relatively close to the bull's eye of the target. Herein, a bull's eye is generally considered to be in a central region of a target, but claimed subject matter is not limited in this respect. The five gunshots depicted in FIG. 40 may have occurred in less than a few seconds, for example. In some cases, of course, the five gunshots may have occurred over several minutes or longer. The distance between target 4020 and firearm 4010 may be any amount, from several meters to hundreds of meters, and claimed subject matter is not limited in this respect. The example gunshots illustrated in FIG. 40 are referred to in example embodiments described below.

Figure 41:
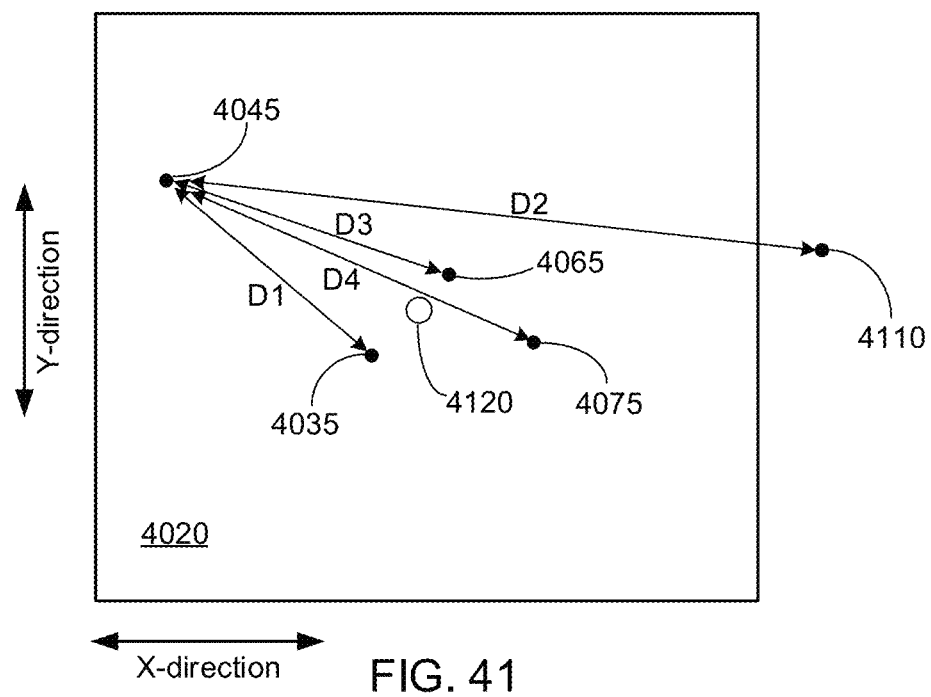
FIG. 41 is a schematic view of a target and bullet strikes, according to some embodiments.

FIG. 41 is a schematic front view of target 4020 and the bullet strikes illustrated in FIG. 40, according to some embodiments. The X-direction is horizontal and the Y-direction is vertical. The Z-direction is in and out of the page. A virtual bullet strike 4110 corresponds to aim direction 4050, which missed target 4020. Virtual bullet strike 4110 is located where a bullet strike would have occurred if the target were larger. In other words, virtual bullet strike 4110 is located to be in the plane of target 4020 (otherwise the divergence of aim direction 4050 from the bull's eye of the target leads to a bullet strike at increasing horizontal distances from the bull's eye as the bullet travels further from the firearm).

A bull's eye 4120 is drawn at the center of target 4020, and is at the intersection between the target and dashed line 4080, which is the reference direction to the center of the target, as illustrated in FIG. 40.

In an embodiment, any of the aim directions for each of the five gunshots may be used as a reference aim direction for the other four gunshots. For example, the second aim direction 4040 of the second gunshot may be used as a reference direction for the first, third, fourth, and fifth gunshots. A number of parameters may be determined from the aim directions for each of the five gunshots. For example, the distribution of bullet strikes on the target may be determined from the aim directions for each of the five gunshots. Also, if the distance between the firearm and the target is known, then distances between and among the bullet strikes on the target may be determined. For example, using trigonometry, a separation distance D1 between the first bullet strike 4035 and the second bullet strike 4045 may be determined from the relative aim directions of the first and second gunshots and the distance between the firearm and the target. Distances D2, D3, and D4 between respective bullet strikes may be similarly determined. In the example embodiment of FIG. 41, such distances are determined with respect to second bullet strike 4035, but any other bullet strike may instead be used for a reference.

Figure 42:
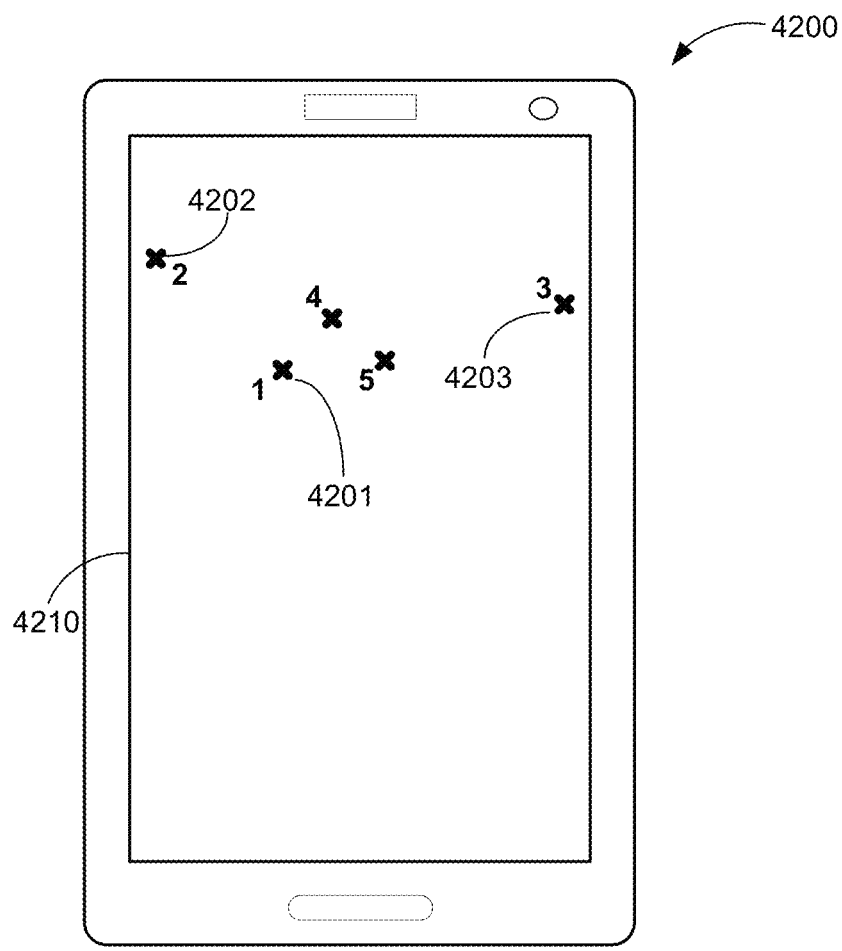
FIGS. 42-45 are schematic views of a mobile computing device having a display displaying bullet strike icons and various display elements, according to some embodiments.

FIG. 42 is a schematic view of a mobile computing device 4200 having a display 4210 displaying bullet strike icons and various display elements, according to some embodiments. For example, an FAS may include a portion (e.g., including one or more sensors, a transmitting device, and so on) disposed on a firearm and another portion that comprises executable code (e.g., an application) executable by mobile computing device 4200. Hereinafter, for sake of convenience, such executable code will be called an application. In some embodiments, such executable code and/or a display may be located on a firearm and need not be located remotely from the firearm.

The following description continues with the example embodiment of the five gunshots fired at target 4020, illustrated in FIG. 40. The mobile computing device may receive data wirelessly from a portion of the FAS disposed on firearm 4010. The data may include aim directions of each of the gunshots, time that each of the gunshots occurred (the time of the gunshots may be time relative to the other gunshots, the time relative to a start time of some time period, time of day/date, or may be elapsed time of day (e.g., such as in a time format measured from midnight of a particular day to the present, like 11:49:03:345, where "11" is hours, "49" is minutes", "03" is seconds, "345" is hundredths of a second, and so on)), and/or the sequence (e.g., order) of the gunshots. The application may use the data to generate a display showing bullet strike icons positioned in the display based, at least in part, on the respective aim directions of each of the gunshots. The application may further place numbers or other type of notation to indicate the order or sequence of the gunshots. For example, referring to FIG. 42, bullet strike icons are indicated by a bold "x", though any type of icon, character, symbol, or image may be used as a bullet strike icon, and claimed subject matter is not so limited.

For example, bullet strike icon 4201 represents bullet strike 4035 on target 4020, bullet strike icon 4202 represents bullet strike 4045, bullet strike icon 4203 represents virtual bullet strike 4110, and so on.

Each bullet strike icon has a number adjacent to it to indicate what number of the gunshot sequence the bullet strike icon corresponds to. For example, bullet strike icon 4201 corresponds to the first gunshot, bullet strike icon 4202 corresponds to the second gunshot, bullet strike icon 4203 corresponds to the third gunshot, and so on. Note that, in the example, the third gunshot missed target 4020. Nevertheless, bullet strike icon 4203 indicates where, relative to the other bullet strikes on the target, a bullet strike from the third shot would be if the target were larger, for example.

Positions of the bullet strike icons are displayed relative to one another based, at least in part, on aim directions of each of the gunshots. The bullet strike icons form a shot pattern. Such a shot pattern may match a shot (bullet strike) pattern on the actual target 4020 (except for the missed third shot). For example, after a shooter fires the five gunshots, the shooter may walk up to the target and see a particular shot pattern on the target. The shooter may look at display 4210 and observe the same (except for the missed third gunshot) particular shot pattern on the display. The similarity between the displayed shot pattern that includes sequence numbers and the shot pattern on the target may allow the shooter to determine the order that the bullet strikes of the shot pattern were made. For example, the shooter may notice that the fourth shot was closest to the bull's eye (e.g., 4120, which is on the actual target 4020), the shot that missed the target was the third shot, the second shot was up and left of the first shot, and so on. Without such sequence numbers, for example, the shooter would observe the shot pattern on the target but may not be able to determine which shot was the first shot, the closest shot, the missed shot, and so on.

Figure 43:
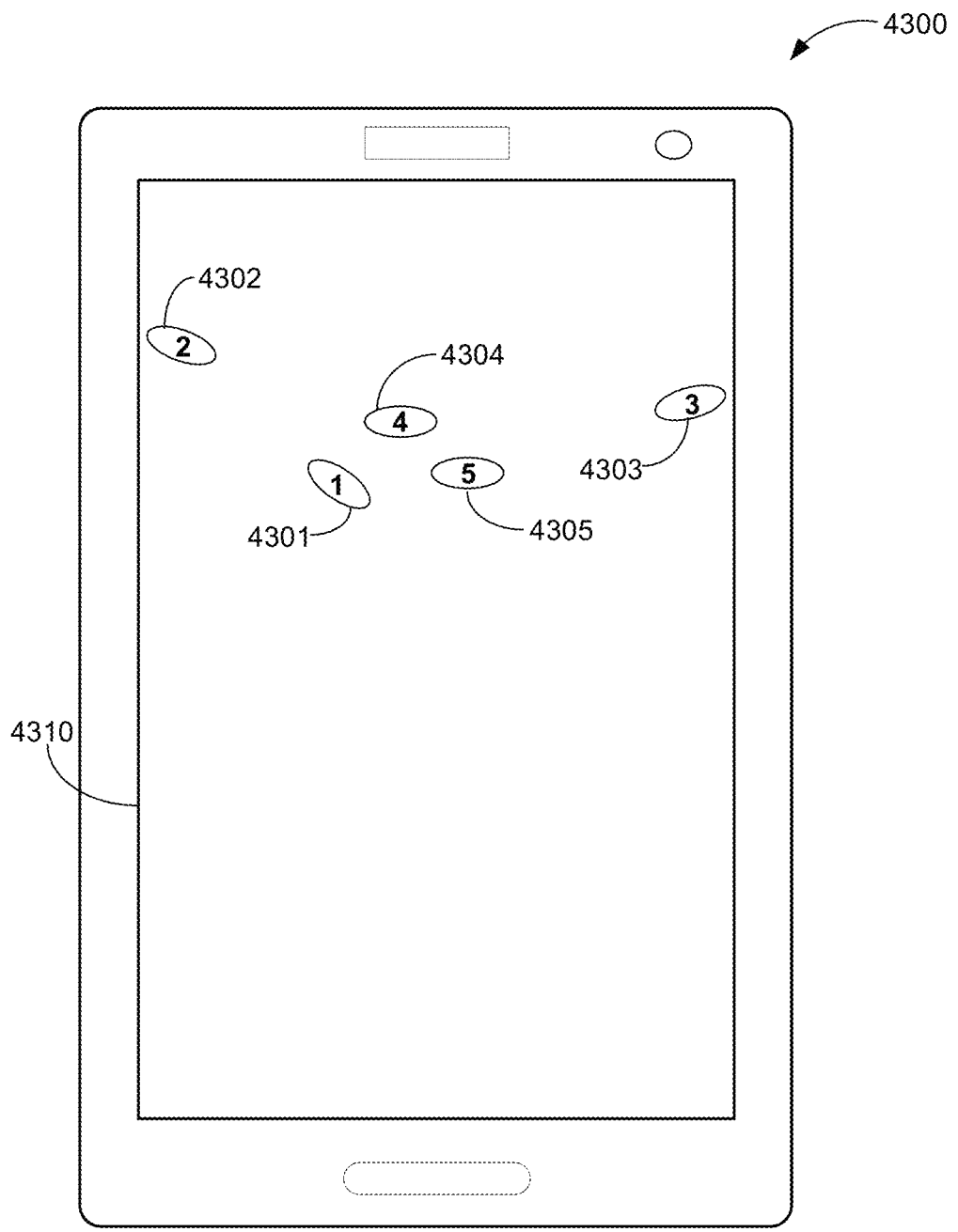

FIG. 43 is a schematic view of a mobile computing device 4300 having a display 4310 displaying bullet strike icons and various display elements, according to some embodiments. For example, an FAS may include a portion (e.g., including one or more sensors, a transmitting device, and so on) disposed on a firearm and another portion that comprises an application executable by mobile computing device 4300. The following description continues with the example embodiment of the five gunshots fired at target 4020, illustrated in FIG. 40. The mobile computing device may receive data wirelessly from a portion of the FAS disposed on firearm 4010. The data may include aim directions of each of the gunshots, time that each of the gunshots occurred, the sequence (e.g., order) of the gunshots, and/or motion information about the firearm while firing the gunshots. Such motion information for the firearm may include vertical translation speed, horizontal translation speed, rotation speed in the firearm plane, and/or rotation speed in the lateral plane. Such motion may be measured with respect to any portion of the firearm, such as the muzzle, the trigger, the grip, the firing chamber, and so on. The application may use the data to generate a display showing bullet strike icons positioned in the display based, at least in part, on the respective aim directions of each of the gunshots. The application may further place numbers or other type of notation to indicate the order or sequence of the gunshots. The bullet strike icons may have shapes that indicate direction of rotation (or translational motion, such as horizontal, vertical, or a combination thereof) of the firearm just before, during, or just after the gunshots that correspond to the respective bullet strikes. Whether the indications of direction of rotation (or translation) are for (i) just before, (ii) during, or (iii) just after the gunshots may be user-selectable for the application, though claimed subject matter is not limited in this respect.

For example, in one implementation, a bullet strike icon for a gunshot (e.g., corresponding to a bullet strike on a target) may indicate the direction of rotation (and/or speed) of the firearm prior to the gunshot. In particular, the firearm may have a particular direction of rotation milliseconds or microseconds before the gunshot, and before recoil from the gunshot affects the direction of rotation. The direction of rotation of the firearm may be measured and recorded with a frequency that is sufficiently high so as to have such a measurement just before a gunshot occurs, for example. Accordingly, the bullet strike icon may indicate the direction of rotation just before the gunshot occurred.

In another implementation, a bullet strike icon for a gunshot may indicate the direction of rotation (and/or speed) of the firearm a predetermined time subsequent to the gunshot. In particular, the firearm may have a particular direction of rotation milliseconds after the gunshot, when recoil from the gunshot begins to affect the direction of rotation. The direction of rotation of the firearm may be measured and recorded with a frequency that is sufficiently high so as to have such a measurement just after a gunshot occurs, for example. Accordingly, the bullet strike icon may indicate the direction of rotation just after the gunshot occurred.

Referring to FIG. 43, bullet strike icons 4301-4305 comprise ellipses, though any type of icon, character, symbol, or image may be used as a bullet strike icon, and claimed subject matter is not so limited. Each bullet strike icon includes a number to indicate what number of the gunshot sequence the bullet strike icon corresponds to. For example, bullet strike icon 4301 corresponds to the first gunshot, bullet strike icon 4302 corresponds to the second gunshot, bullet strike icon 4303 corresponds to the third gunshot, and so on. Note that, in the example, the third gunshot missed target 4020. Nevertheless, bullet strike icon 4303 indicates where, relative to the other bullet strikes on the target, a bullet strike from the third shot would be if the target were larger, for example.

Positions of the bullet strike icons are displayed relative to one another based, at least in part, on aim directions of each of the gunshots. The bullet strike icons form a shot pattern. Such a shot pattern may match a shot (bullet strike) pattern on the actual target 4020 (except for the missed third shot).

The bullet strike icons are oriented based, at least in part, on direction of rotation of the firearm just before, during, or just after the gunshot corresponding to each of the bullet strike icons. For example, bullet strike icon 4304 for the fourth gunshot is oriented substantially horizontally to indicate that the rotation direction of the firearm was horizontal just before, during, or just after the fourth gunshot. As another example, bullet strike icon 4301 for the first gunshot is oriented diagonally toward the upper left portion of display 4310 to indicate that the rotation direction of the firearm was upward and toward the left just before, during, or just after the first gunshot. A shooter may use such information to determine details of a group of gunshots (e.g., the five gunshots, which may have occurred over a span of a few second) that would otherwise be difficult or impossible to determine without an FAS, for example.

Figure 44:
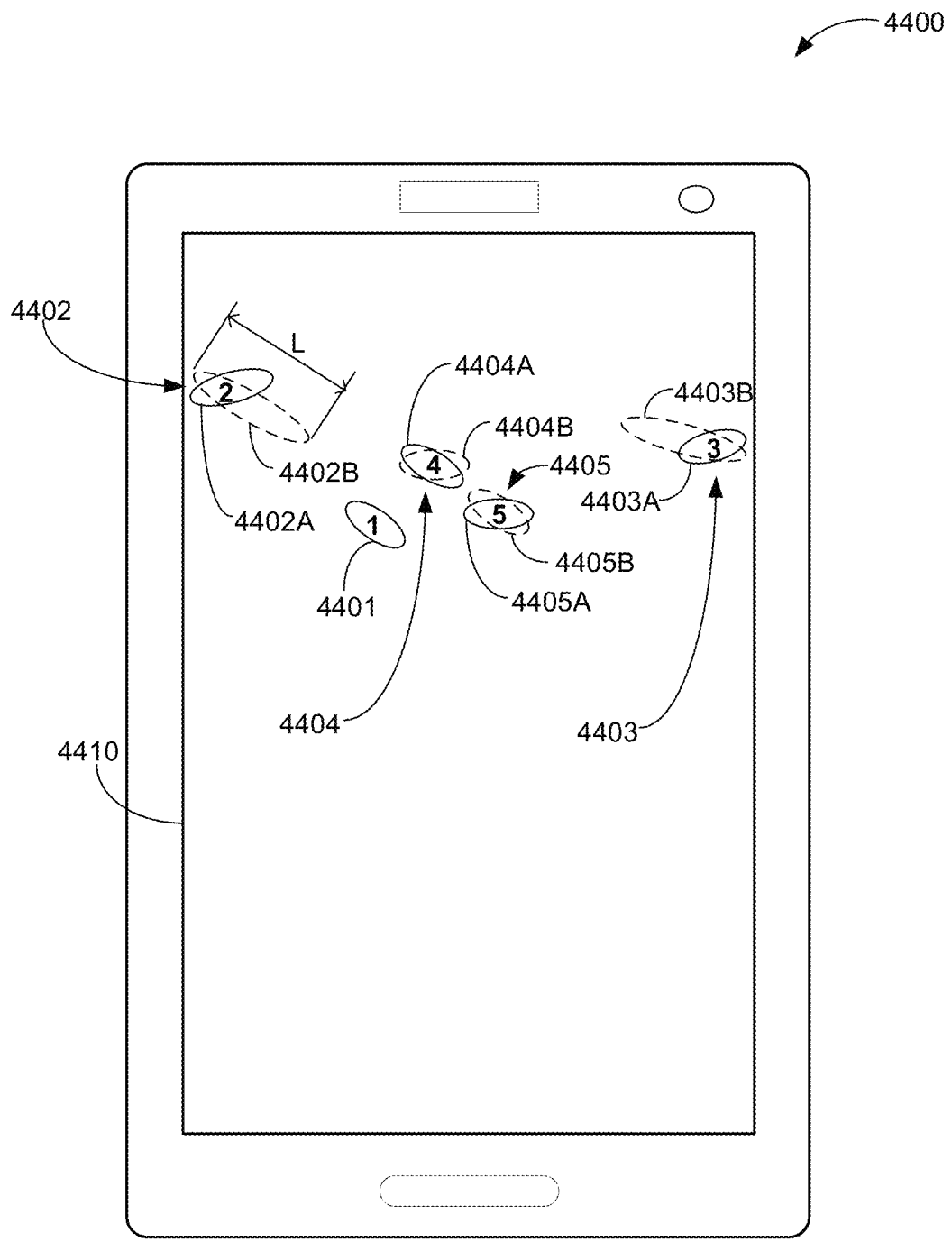

FIG. 44 is a schematic view of a mobile computing device 4400 having a display 4410 displaying bullet strike icons and various display elements, according to some embodiments. For example, an FAS may include a portion (e.g., including one or more sensors, a transmitting device, and so on) disposed on a firearm and another portion that comprises an application executable by mobile computing device 4400. The following description continues with the example embodiment of the five gunshots fired at target 4020, illustrated in FIG. 40. The mobile computing device may receive data wirelessly from a portion of the FAS disposed on firearm 4010. The data may include aim directions of each of the gunshots, time that each of the gunshots occurred, the sequence (e.g., order) of the gunshots, and/or motion information about the firearm while firing the gunshots. Such motion information for the firearm may include vertical translation speed, horizontal translation speed, rotation speed in the firearm plane, and/or rotation speed in the lateral plane. The application may use the data to generate a display showing bullet strike icons positioned in the display based, at least in part, on the respective aim directions of each of the gunshots. The application may further place numbers or other type of notation to indicate the order or sequence of the gunshots. The bullet strike icons may have shapes that indicate direction of rotation (or translational motion, such as horizontal, vertical, or a combination thereof) of the firearm just before, during, or just after the gunshots that correspond to the respective bullet strikes. Whether the indications of direction of rotation (or translation) are for (i) just before, (ii) during, or (iii) just after the gunshots may be user-selectable by the application, though claimed subject matter is not limited in this respect.

For example, in one implementation, a bullet strike icon for a gunshot (e.g., corresponding to a bullet strike on a target) may indicate the direction of rotation (and/or speed) of the firearm prior to the gunshot and subsequent to the gunshot. In particular, the firearm may have a particular direction of rotation milliseconds or microseconds before the gunshot, and before recoil from the gunshot affects the direction of rotation. The direction of rotation of the firearm may be measured and recorded with a frequency that is sufficiently high so as to have such a measurement just before a gunshot occurs, for example. Accordingly, the bullet strike icon may indicate the direction of rotation just before the gunshot occurred.

A bullet strike icon for a gunshot may also indicate the direction of rotation (and/or speed) of the firearm a predetermined time subsequent to the gunshot. In particular, the firearm may have a particular direction of rotation milliseconds after the gunshot (e.g., when recoil from the gunshot begins to affect the direction of rotation). The direction of rotation of the firearm may be measured and recorded with a frequency that is sufficiently high so as to have such a measurement just after a gunshot occurs, for example. Accordingly, the bullet strike icon may indicate both the direction of rotation just before and just after the gunshot occurred.

Referring to FIG. 44, a bullet strike icon 4401 for the first gunshot comprises one ellipse and bullet strike icons 4402-4405 comprise two ellipses, though any type of icon, character, symbol, or image may be used as a bullet strike icon, and claimed subject matter is not so limited. In particular, bullet strike icons for gunshots subsequent to the first gunshot include two ellipses (though any of a number of patterns or shapes to indicate amount of rotation may be used). In the example embodiment, the bullet strike icon for the second gunshot comprises (i) ellipse 4402B that indicates the direction of rotation of the firearm a fraction of a second before the time of the second gunshot and (ii) ellipse 4402A that indicates the direction of rotation of the firearm a fraction of a second after the time of the second gunshot. Additionally, in some implementations, the size of the ellipses (e.g., the length of a major axis of the ellipses) may indicate the speed of the rotation. Thus, for example, the length L of ellipse 4402B may indicate a speed of rotation (or translation) of the firearm a fraction of a second before the second shot was fired. From the figure, the relatively shorter ellipse 4402A indicates that the rotation (or translation) speed of the firearm after the second gunshot was less than the rotation (or translation) speed of the firearm after the second gunshot.

In further examples, the bullet strike icon for the third gunshot comprises (i) ellipse 4403B that indicates the direction of rotation of the firearm a fraction of a second before the time of the third gunshot and (ii) ellipse 4403A that indicates the direction of rotation of the firearm a fraction of a second after the time of the second gunshot. Relative lengths of the ellipses indicate that the rotation (or translation) speed of the firearm was greater before the third gunshot as compared to after the third gunshot. The bullet strike icon for the fourth gunshot comprises (i) ellipse 4404B that indicates the direction of rotation of the firearm a fraction of a second before the time of the fourth gunshot and (ii) ellipse 4404A that indicates the direction of rotation of the firearm a fraction of a second after the time of the fourth gunshot. Relative lengths of the ellipses indicate that the rotation (or translation) speeds of the firearm before and after the fourth gunshot are similar or substantially the same. The bullet strike icon for the fifth gunshot comprises (i) ellipse 4405B that indicates the direction of rotation of the firearm a fraction of a second before the time of the fifth gunshot and (ii) ellipse 4405A that indicates the direction of rotation of the firearm a fraction of a second after the time of the fifth gunshot. Relative lengths of the ellipses indicate that the rotation (or translation) speeds of the firearm before and after the fifth gunshot are similar or substantially the same.

Each bullet strike icon includes a number to indicate what number of the gunshot sequence the bullet strike icon corresponds to. For example, bullet strike icon 4401 corresponds to the first gunshot, bullet strike icon 4402 (comprising ellipses 4402A and 4402B) corresponds to the second gunshot, bullet strike icon 4403 (comprising ellipses 4403A and 4403B) corresponds to the third gunshot, and so on. Note that, in the example, the third gunshot missed target 4020. Nevertheless, bullet strike icon 4403 indicates where, relative to the other bullet strikes on the target, a bullet strike from the third shot would be if the target were larger, for example.

Positions of the bullet strike icons are displayed relative to one another based, at least in part, on aim directions of each of the gunshots. The bullet strike icons form a shot pattern. Such a shot pattern may match a shot (bullet strike) pattern on the actual target 4020 (except for the missed third shot).

As described above, the bullet strike icons are oriented based, at least in part, on direction of rotation of the firearm just before and just after the gunshot corresponding to each of the bullet strike icons. For example, ellipse 4404B of bullet strike icon 4404 for the fourth gunshot is oriented substantially horizontally to indicate that the rotation direction of the firearm was horizontal just before the fourth gunshot. Moreover, ellipse 4404A is oriented diagonally toward the upper left portion of display 4410 to indicate that the rotation direction of the firearm was upward and toward the left just after the fourth gunshot. As another example, bullet strike icon 4401 for the first gunshot is oriented diagonally toward the upper left portion of display 4410 to indicate that the rotation direction of the firearm was upward and toward the left just before, during, or just after the first gunshot (e.g., depending, at least in part, on a setting in the application). A shooter may use such information to determine details of a group of gunshots (e.g., the five gunshots, which may have occurred over a span of a few second) that would otherwise be difficult or impossible to determine without an FAS, for example.

Figure 45:
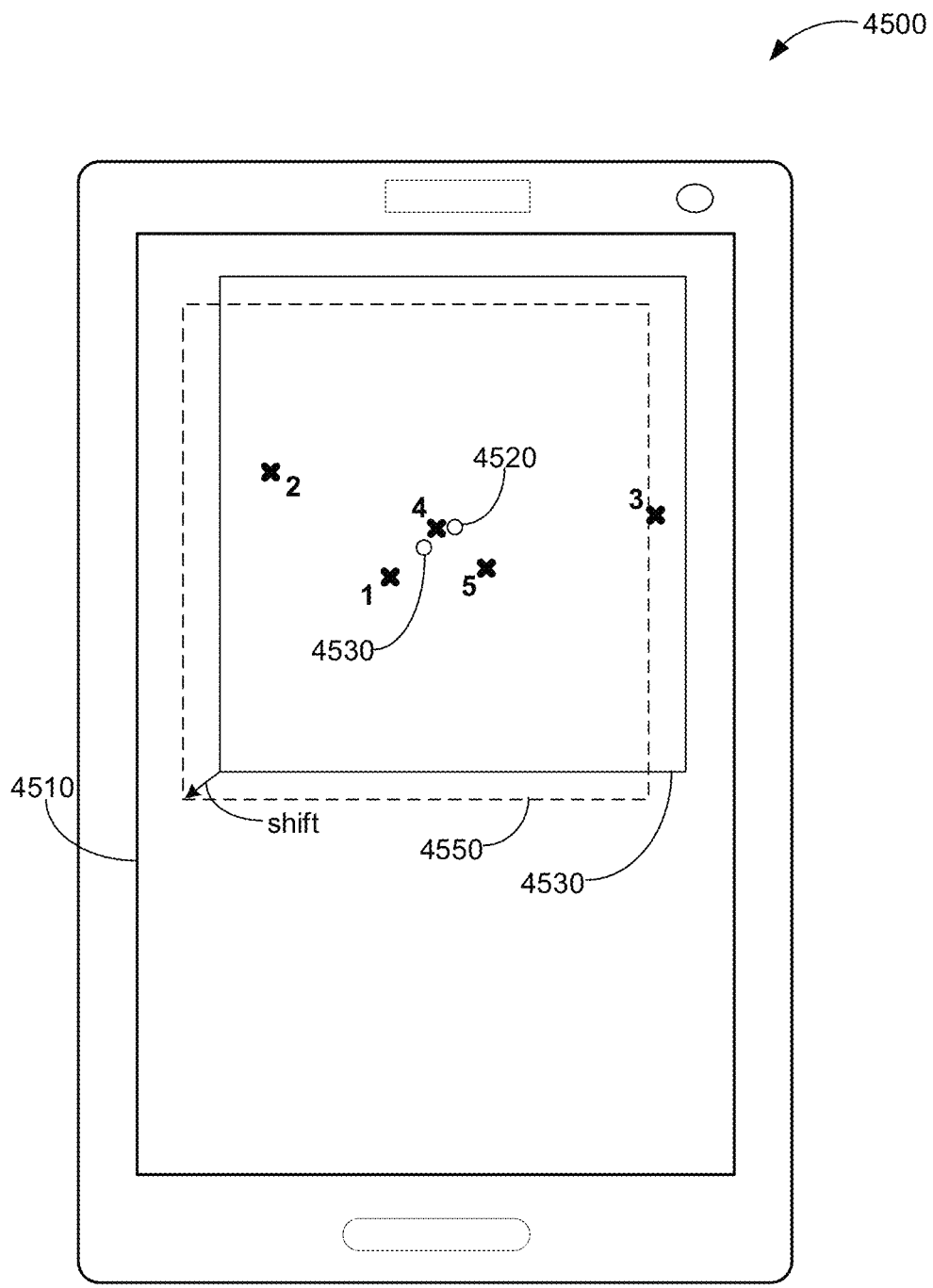

FIG. 45 is a schematic view of a mobile computing device 4500 having a display 4510 displaying bullet strike icons and various display elements, according to some embodiments. For example, an FAS may include a portion (e.g., including, among other things, one or more sensors (e.g., acoustic and/or 3D sensors), a transmitting device, and so on) disposed on a firearm and another portion that comprises an application executable by mobile computing device 4500. The following description continues with the example embodiment of the five gunshots fired at target 4020, illustrated in FIG. 40. The mobile computing device may receive data wirelessly from a portion of the FAS disposed on firearm 4010. The data may include information regarding aim directions of each of the gunshots, time that each of the gunshots occurred, the sequence (e.g., order) of the gunshots, and/or motion information (e.g., translational and/or rotational) about the firearm while firing the gunshots. Such motion information for the firearm may include vertical translation speed, horizontal translation speed, rotation speed in the firearm plane, and/or rotation speed in the lateral plane. The application may use the data to generate a display showing bullet strike icons positioned in the display based, at least in part, on the respective aim directions of each of the gunshots. The application may further place numbers or other type of notation to indicate the order or sequence of the gunshots.

In some embodiments, the application may have a capability of analyzing data so as to perform any of a number of functions, such as pattern recognition, position averaging, scaling, uncertainty determination, and various statistical analyses, for example. Such functions may determine a "center of mass" or distribution center of the bullet strikes on the target. In some implementations, a virtual bull's eye 4520 may be included in display 4510. The location of virtual bull's eye in the display may be based, at least in part, on locations of the bullet strikes. For example, virtual bull's eye 4520 may be located at a center of distribution of the five bullet strike icons in display 4510. Additionally, a virtual target 4530 may be drawn in the display. The application may apply scaling processes to adjust the locations of the bullet strike icons and/or the virtual target so as to have a best-fit and be centered in the display. In some implementations, the application may assume that the group of shots (e.g., the five gunshots) is at least approximately centered about the actual bull's eye of target 4020. Using such an assumption, the application may draw virtual target 4530 in the display.

In some embodiments, a user may provide information to an FAS so that the FAS may determine a direction of a target. For example, while a shooter (user) has a bull's eye of a target in sights or a scope of the firearm, the shooter may use a voice command to specify to the FAS at what direction the firearm is aimed when the firearm is aimed at the bull's eye of the target (or any target or portion thereof). In a particular example, the shooter may say "target" while the firearm is aimed at the bull's eye. In response to receiving such a voice command, the FAS may measure the aim direction of the firearm and set that measurement as the aim direction of the bull's eye. (In some implementations, the FAS may have already measured the aim direction at the time of the voice command. Thus, in this case, the FAS may store the aim direction measured at the time of the voice command as the aim direction of the bull's eye.) Aim directions of subsequent gunshots may then be referenced to the aim direction of the bull's eye by displaying strike icons located relative to a display icon that represents the bull's eye. If the sights or scope of the firearm is accurate, then this process may provide a display that is an accurate representation of the aim directions of the gunshots relative to the bull's eye.

In some implementations, the application may determine (e.g., statistically) outlying bullet strikes. For example, any bullet strikes relatively far from a center of distribution of the bullet strikes may be considered an outlier. In the example, the bullet strike for the third gunshot may be considered an outlier because it is relatively far away from virtual bull's eye 4520. If so then, in some implementations, the center of distribution of the bullet strikes may be updated or recalculated after excluding the outlying bullet strike. Here, for example, the third bullet strike is excluded as an outlier and a new center of distribution of the remaining bullet strikes becomes virtual bull's eye 4540. Accordingly, the application may draw an updated virtual target 4550 in the display. Thus, in this example, removing the third gunshot bullet strike may result in a shift in positions of the distribution of the remaining bullet strikes relative to a virtual target. In this fashion, locations of the bullet strikes on a virtual target may be relatively close to locations of actual bullet strikes on the actual target. In some implementations, a user may provide target information to the application to assist the application in more accurately determining how to draw a virtual target with respect to locations of the bullet strikes. Such target information may include distance between the firearm and the target, size of the target, shape of the target (e.g., circular, square, rectangular, etc.), and/or dimensions of the target. In some implementations, FAS may have an ability to capture an image of a target (e.g., via a camera) and use any of a number image analysis techniques to determine various characteristics of the target, such as size, shape, and/or distance.

As described above, an FAS may perform functions for a group of gunshots at a single target. In some embodiments, an FAS may perform such functions for groups of gunshots fired at respective multiple targets. For example, in Practical Shooting competitions, a shooter may proceed through a course by firing several gunshots at a first target, firing several gunshots at a second target, followed by firing several gunshots at a third target. An FAS may have the capability to keep track of all the gunshots. Information regarding the gunshots may be provided to an application that may display a "replay" of all the gunshots fired by the shooter including, for example, a display rendering of the course. Timing information in addition to aim directions (which may be displayed as bullet strike icons on every target) may be included in such a "replay". Such a replay or recreation on a display may allow viewers to see the earlier performance of the shooter. For a particular illustrative example, viewers may be able to observe that the shooter's most accurate gunshots were the first and third on the first target, and the shooter fired seven gunshots at the second target but missed the fourth and fifth gunshots, and that all five of the gunshots fired at the third target hit the target. Any of a number of the gunshots may be associated with timing information so that a viewer may observe elapsed time between gunshots, and so on. Such information may be stored and retrieved as historical data listed in table form or rendered as a display, for example.

In some implementations, an FAS may include a capability to measure distance between the firearm and target. For example, such a capability may be provided by any of a number of techniques, such as techniques involving radar, lidar, or active sonar, where sound is emitted, reflected from an object, and detected to determine distance from the object. In some implementations, the sound of a gunshot may be used for a sonar signal to reflect from a target to detect a distance to the target at which the firearm is aimed at the time of the gunshot. For example, the sound (e.g., or sound signature, or portion thereof) from the gunshot may travel toward a target, reflect from the target, and be subsequently detected by the FAS. Distance to the target may be determined using time-of-flight of the gunshot sound. Such an FAS may include, among other things, a sonar module to determine distance based, at least in part, on elapsed time of sound travel. A sonar module of the FAS may receive information from clocks or timers of the FAS, and may include executable code to calculate distance to a target using received timer or clock information for when the gunshot occurs and when the reflected sound of the gunshot is detected, for example. In some implementations, a gunshot sound used for a distance measurement (e.g., using sonar) may also be used to initiate a measurement of aim direction of the firearm.

Figure 46:
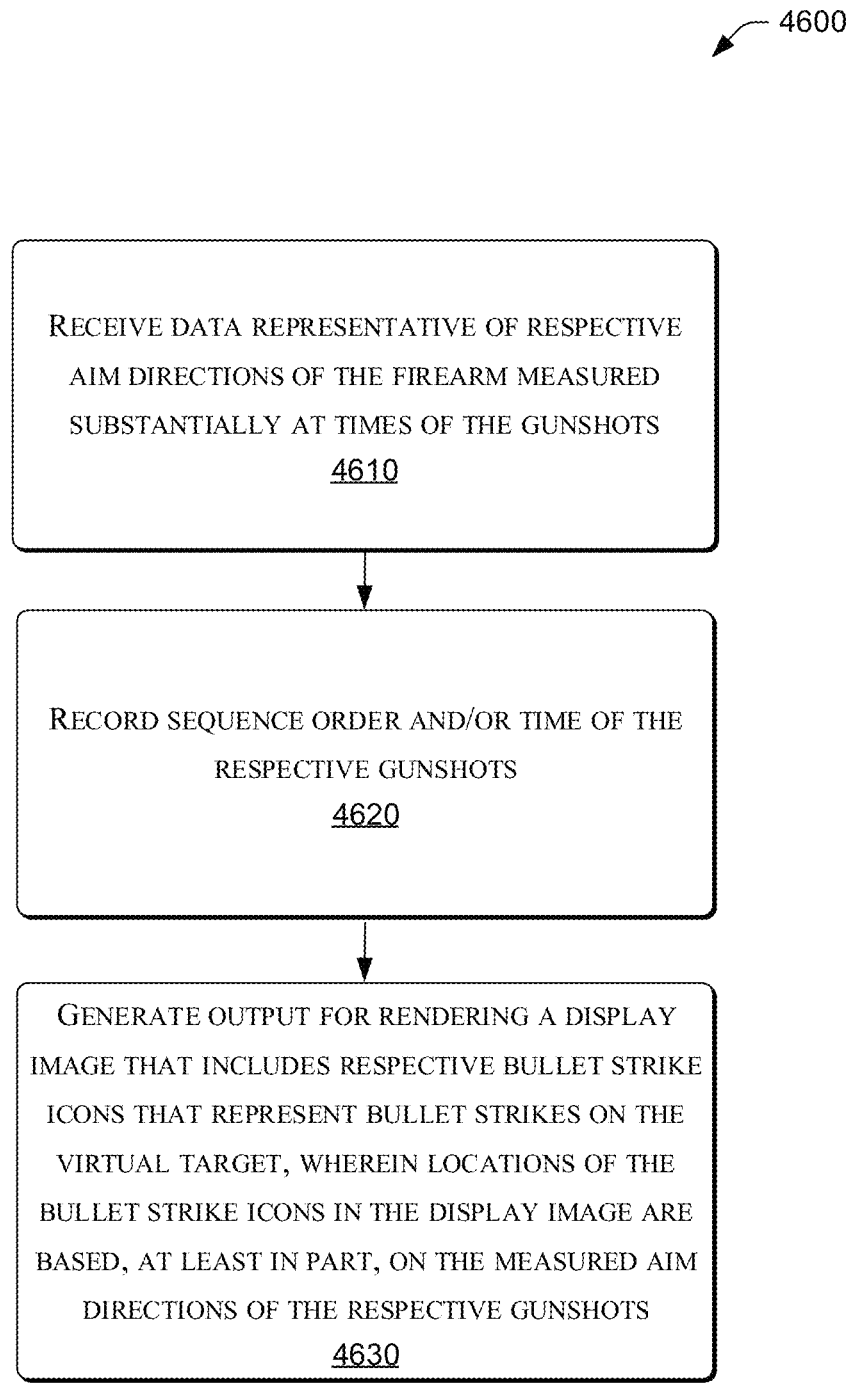
FIG. 46 is a flow diagram of a process for displaying bullet strikes of gunshots of a firearm on a virtual target, according to some embodiments.

FIG. 46 is a flow diagram of a process 4600 for displaying icons that represent bullet strikes of gunshots of a firearm on a target, according to some embodiments. For example, process 4600 may be performed by an FAS. In some implementations, process 4600 may be performed by a portion of the FAS located on the firearm. In other implementations, process 4600 may be performed by a portion of the FAS located remotely from the firearm. In such a case, another portion of the FAS located on the firearm may communicate with the remote portion of the FAS via wireless signals (e.g., Bluetooth, etc.). In still other implementations, process 4600 may be performed by a portion of the FAS located remotely from the firearm and another portion of the FAS located on the firearm.

An icon or other symbol or display element for a bullet strike of a gunshot may be located in a display according to aim direction of the gunshot (e.g., aim direction of the firearm at the time of the gunshot). Such icons may be the same as or similar to bullet strike icon 4201 illustrated in FIG. 42, for example.

At block 4610, an FAS, or a portion thereof, may receive data representative of respective aim directions of the firearm measured substantially at times of the gunshots. As described above, such measurements of aim directions may involve acoustic and/or 3D sensors included in an FAS, for example At block 4620, the FAS, or a portion thereof, may record (e.g. store in memory) a sequence order of the respective gunshots and/or times of the respective gunshots. At block 4630, the FAS, or a portion thereof, may generate output for displaying an image that includes respective bullet strike icons that represent bullet strikes on the virtual target. Locations of the bullet strike icons in the display image may be based, at least in part, on the measured aim directions of the respective gunshots.

In some embodiments, an FAS may generate a signal that is transmitted to an earpiece or set of headphones that produces, in response to receiving the signal, an audible alarm or alert. For example, dynamic headphones block sounds from entering a user's ear(s) (the user being the person wearing the dynamic headphones), while electronically transmitting relatively low intensity sounds (e.g., people talking, ambient sounds) to the ear(s). Loud sounds, such as gunshot sounds, are attenuated so that the user need not be subjected to such loud sounds. Such headphones may include electronics that receive a wireless signal from an FAS, and transform the received signal to a sound audible to the user.

In some embodiments, an FAS, or a portion thereof, may be mounted to a portion of a clip or magazine that is used to hold ammunition and can be inserted into a firearm. For example, an FAS, or a portion thereof, may be located on a firearm via the clip or magazine of the firearm. In a particular example, referring to FIG. 1, an FAS, or a portion thereof, may be attached to a portion of the detachable magazine.

In some embodiments, an FAS, or a portion thereof, may generate a signal that is transmitted (wired or wirelessly) to a scope (e.g., scope 510, illustrated in FIG. 5) mounted on a firearm. The scope may include electronics to display information conveyed by the signal. Such information may include aim direction of the firearm, recoil information (such as that described above, for example), shot sequence information, motion information of the firearm, distance-to-target, and any other type of information that may be displayed as described for FIGS. 13, 25, 38, 39, and 41-45, for example. The scope may display the information using any of a number of display technologies, such as LCD, LED, electronic ink, electrowetting, reflective, transmissive, and so on, for example. In some implementations, a shooter, looking into the scope, may observe a magnified view of a target (e.g., the general view of a scope for shooting at a target) and a display displaying information from an FAS.

In some embodiments, an FAS, or a portion thereof, may generate a signal that is transmitted (wired or wirelessly) to wearable glasses worn by a person. The wearable glasses may include electronics to display information conveyed by the signal. Such information may include aim direction of the firearm, recoil information (such as that described above, for example), shot sequence information, motion information of the firearm, distance-to-target, and any other type of information that may be displayed as described for FIGS. 13, 25, 38, 39, and 41-45, for example. The wearable glasses may display the information using any of a number of display technologies, such as LCD, LED, electronic ink, electrowetting, reflective, transmissive, and so on, for example.

In some embodiments, an FAS may be remote from a firearm while two or more beacons may be located on the firearm. For example, such beacons may be relatively small and be placed on or near distal regions of a firearm (e.g., one beacon located near the grip and the other beacon located near the muzzle). Beacons may emit a radio signal or a sound signal. Such a signal may be encoded with a system-global clock, beacon identity, and/or a carrier signal, for example. The FAS may receive signals from respective beacons and use the signals to determine distances between the FAS and the respective beacons. Techniques to determining distances may involve Doppler, multilateration, time-of-flight, and so on. Knowledge of distances to the respective beacons may allow a determination of orientation and/or motion of the firearm, for example.

It will, of course, be understood that, although particular embodiments have just been described, claimed subject matter is not limited in scope to a particular embodiment or implementation. For example, one embodiment may be in hardware, such as implemented on a device or combination of devices, for example. Likewise, although claimed subject matter is not limited in scope in this respect, one embodiment may comprise one or more articles, such as a storage medium or storage media that may have stored thereon instructions capable of being executed by a specific or special purpose system or apparatus, for example, to lead to performance of an embodiment of a method in accordance with claimed subject matter, such as one of the embodiments previously described, for example. However, claimed subject matter is, of course, not limited to one of the embodiments described necessarily. Furthermore, a specific or special purpose computing platform may include one or more processing units or processors, one or more input/output devices, such as a display, a keyboard or a mouse, or one or more memories, such as static random access memory, dynamic random access memory, flash memory, or a hard drive, although, again, claimed subject matter is not limited in scope to this example.

The terms, "and" and "or" as used herein may include a variety of meanings that will depend at least in part upon the context in which it is used. Typically, "or" or "and/or" if used to associate a list, such as A, B or C, is intended to mean A, B, and C, here used in the inclusive sense, as well as A, B or C, here used in the exclusive sense. Embodiments described herein may include machines, devices, engines, or apparatuses that operate using digital signals. Such signals may comprise electronic signals, optical signals, electromagnetic signals, or any form of energy that provides information between locations.

In the description herein, various aspects of claimed subject matter have been described. For purposes of explanation, specific numbers, systems, or configurations may have been set forth to provide a thorough understanding of claimed subject matter. However, it should be apparent to one skilled in the art having the benefit of this disclosure that claimed subject matter may be practiced without those specific details. In other instances, features that would be understood by one of ordinary skill were omitted or simplified so as not to obscure claimed subject matter.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A method for shooting performance training, the method comprising:
   receiving, from a motion sensor, electronic signals representative of motion of a firearm;
   detecting a shot;
   continuously tracking, based at least in part on the electronic signals, the motion of the firearm before and after the shot to generate tracking data;
   retrieving, from an electronic memory, a reference target direction based at least in part on a prior shot measured by the motion sensor; and
   based at least in part on the tracking data and the reference target direction, generating data for a display of a user interface.

2. The method of claim 1, further comprising tracking, based at least in part on the electronic signals, the motion of the firearm during a trigger pull that results in the shot.

3. The method of claim 1, wherein the user interface is on a smartphone or other handheld device.

4. The method of claim 1, further comprising transmitting the data to the user interface via Bluetooth.

5. The method of claim 1, wherein generating the data for the display of the user interface comprises: generating data for displaying a plot in the display, wherein the plot represents the tracked motion of the firearm before and after the shot.

6. The method of claim 5, wherein the plot further represents the tracked motion of the firearm with respect to the reference target direction.

7. The method of claim 1, further comprising providing to a user real-time audio or visual feedback that signifies deviation of an aim direction of the firearm from the reference target direction.

8. The method of claim 1, further comprising analyzing the tracking data to perform pattern recognition of bullet strikes on a target.

9. The method of claim 8, wherein the generated data for the display is further based at least in part on the pattern recognition, the method further comprising displaying a virtual bull's eye on the display.

10. The method of claim 1, further comprising storing a tracking history of the motion of the firearm based at least in part on the tracking data.

11. A device comprising:
    electronic memory;
    one or more motion sensors; and
    a processor or electronics configured to:
       receive, from the one or more motion sensors, electronic signals representative of motion of a firearm;
       detect a shot;
       continuously track, based at least in part on the electronic signals, the motion of the firearm before and after the shot to generate tracking data;
       retrieve, from the electronic memory, a reference target direction based at least in part on a prior shot measured by the one or more motion sensors; and
       based at least in part on the tracking data, generate data for a display of a user interface.

12. The device of claim 11, wherein the processor or electronics are further configured to track, based at least in part on the electronic signals, the motion of the firearm during a trigger pull that results in the shot.

13. The device of claim 11, wherein generating the data for the display of the user interface comprises: generating data for displaying a plot in the display, wherein the plot represents the tracked motion of the firearm.

14. The device of claim 11, wherein the processor or electronics are further configured to provide to a user real-time audio or visual feedback that signifies deviation of an aim direction from the reference target direction.

15. The device of claim 11, wherein the processor or electronics are further configured to analyze the tracking data to perform pattern recognition of bullet strikes on a target.

16. The device of claim 11, wherein the processor or electronics are further configured to store, via the electronic memory, a tracking history of the motion of the firearm based at least in part on the tracking data.

17. The device of claim 11, further comprising a trigger sensor configured to measure rate of trigger pull, wherein the processor or electronics are further configured to:
  generate a history of rates of trigger pull; and
  determine trigger pull consistencies and/or irregularities of a shooter based on the history.

18. The device of claim 11, further comprising a trigger sensor configured to indicate whether a user's finger is touching a trigger of the firearm.

19. The device of claim 11, wherein the processor or electronics are further configured to:
  receive location data associated with a satellite positioning system, WiFi, Bluetooth, wireless signal strength heatmaps, and/or access point signals; and
  determine location of the firearm based, at least in part, on the location data.

20. The device of claim 19, wherein the processor or electronics are further configured to:
  via the electronic memory, store safety criteria of venues;
  compare the location of the firearm to predetermined respective locations of the venues;
  determine, based on the comparison, at which particular venue the firearm is located; and
  modify, based on the particular venue, the safety criteria.

* * * * *